(12) United States Patent
Lin et al.

(10) Patent No.: US 12,163,500 B2
(45) Date of Patent: Dec. 10, 2024

(54) LARGE TIDAL CURRENT ENERGY GENERATING DEVICE AND ASSEMBLY PLATFORM THEREOF

(71) Applicants: HANGZHOU LHD INSTITUTE OF NEW ENERGY, LLC, Zhejiang (CN); HANGZHOU LINDONG NEW ENERGY TECHNOLOGY INC., Zhejiang (CN); ZHEJIANG ZHOUSHAN LHD ENERGY DEVELOPMENT CO., LTD., Zhejiang (CN); ZHOUSHAN LINDONG TIDAL CURRENT POWER GENERATION CO., LTD., Zhejiang (CN)

(72) Inventors: Dong Lin, Zhejiang (CN); Fuwei Zhu, Zhejiang (CN)

(73) Assignees: HANGZHOU LHD INSTITUTE OF NEW ENERGY, LLC, Zhejiang (CN); HANGZHOU LINDONG NEW ENERGY TECHNOLOGY INC., Zhejiang (CN); ZHEJIANG ZHOUSHAN LHD ENERGY DEVELOPMENT CO., LTD., Zhejiang (CN); ZHOUSHAN LINDONG TIDAL CURRENT POWER GENERATION CO., LTD., Zhejiang (CN)

( * ) Notice: Subject to any disclaimer, the term of this patent is extended or adjusted under 35 U.S.C. 154(b) by 0 days.

(21) Appl. No.: 18/009,934

(22) PCT Filed: Jun. 10, 2020

(86) PCT No.: PCT/CN2020/095387
§ 371 (c)(1),
(2) Date: Dec. 12, 2022

(87) PCT Pub. No.: WO2021/248369
PCT Pub. Date: Dec. 16, 2021

(65) Prior Publication Data
US 2023/0151792 A1 May 18, 2023

(51) Int. Cl.
*F03B 13/00* (2006.01)
*F03B 13/26* (2006.01)

(52) U.S. Cl.
CPC ........ *F03B 13/264* (2013.01); *F05B 2240/97* (2013.01)

(58) Field of Classification Search
CPC ........ F03B 13/264; F03B 17/061; F03B 3/04; F03B 3/128; F03B 11/00; F05B 2240/97;
(Continued)

(56) References Cited

U.S. PATENT DOCUMENTS

| | | |
|---|---|---|
| 5,440,176 A | 8/1995 | Haining |
| 2008/0284176 A1 | 11/2008 | Fraenkel |
| 2022/0186452 A1 | 6/2022 | Lin et al. |

FOREIGN PATENT DOCUMENTS

| | | | |
|---|---|---|---|
| CA | 2832246 A1 * | 3/2013 | ............... B63B 1/14 |
| CN | 102636750 B | 8/2012 | |

(Continued)

*Primary Examiner* — Julio C. Gonzalez
(74) *Attorney, Agent, or Firm* — MUNCY, GEISSLER, OLDS & LOWE, P.C.

(57) ABSTRACT

The present invention provides a large tidal current energy generating device and an assembly platform (1) thereof. At least one horizontal axis hydro-generator (2) is installed in the assembly platform (1). The assembly platform (1) includes at least four fixed piles (11), at least two force-bearing blocks (12), at least two force-bearing supports (13), and supports (14). The at least four fixed piles are connected through the supports to form an installation space (15). The (Continued)

at least one horizontal axis hydro-generator is installed inside the installation space. One end of each fixed pile is driven to be fixed to a seabed and the other end extends to be above a water surface. The at least four fixed piles are arranged in left and right columns relative to a water flow direction, and each column of the fixed piles is arranged along the water flow direction. The at least two force-bearing blocks are fixed to the corresponding fixed piles or supports and located on left and right sides of the horizontal axis hydro-generator below the water surface, respectively. Ends of the at least two force-bearing supports are respectively mounted on the left and right sides of the horizontal axis hydro-generator relative to the water flow direction and the other ends are respectively against the corresponding force-bearing blocks.

15 Claims, 13 Drawing Sheets

(58) Field of Classification Search
CPC .......... F05B 2220/706; F05B 2240/916; F05B 2260/04; F05B 2260/96; F05B 2220/32; E02B 17/00; E02B 9/08; E02B 2017/0056; Y02E 10/20; Y02E 10/30; Y02E 10/72

See application file for complete search history.

(56) References Cited

FOREIGN PATENT DOCUMENTS

| | | | |
|---|---|---|---|
| CN | 202730733 | U | 2/2013 |
| CN | 103899489 | A | 7/2014 |
| CN | 203756424 | U | 8/2014 |
| CN | 204152718 | U | 2/2015 |
| CN | 105401564 | A | 3/2016 |
| CN | 105781864 | A | 7/2016 |
| CN | 107725265 | A | 2/2018 |
| CN | 207333103 | U | 5/2018 |
| CN | 110566397 | A | 12/2019 |
| JP | S60113072 | A | 6/1985 |
| JP | H08210237 | A | 8/1996 |
| JP | 2006521498 | A | 9/2006 |
| KR | 200426926 | Y1 | 9/2006 |
| WO | WO-2016181101 | A1 | 11/2016 |

\* cited by examiner

LARGE TIDAL CURRENT ENERGY GENERATING DEVICE AND ASSEMBLY PLATFORM THEREOF

TECHNICAL FIELD

The present invention belongs to the field of tidal current energy power generation, in particular to a large tidal current energy generating device and an assembly platform thereof.

BACKGROUND

Ocean energy (including tidal current energy, wave energy, temperature difference energy, salinity gradient energy, ocean current energy and the like) is a clean and pollution-free renewable energy source featuring in rich reserve, wide distribution and extremely good development prospect and value. Nowadays, with increasingly short of energy sources and increasingly severe greenhouse effect, it is necessary for energy sources to be low-carbon, so that clean energy sources such as wind energy and ocean energy are a development direction of future energy sources. However, except the relatively mature wind energy utilization, the power generating devices for these clean energy sources are still developing, and the utilization of ocean energy is still in a starting stage without universal and mature devices, so that the power generation power is lower compared with that of other energy sources. Most important, the manufacturing cost, the installation cost or the maintenance cost of an existing ocean energy power generation apparatus are far higher than the cost of other energy source power generation, which becomes the largest obstacle that restrains commercial application and popularization of the ocean energy power generation apparatus.

At present, the single installed power of a wind power generation apparatus that generates power by using offshore wind power may reach 5 MW to the maximum extent. It is structured such that a tower is fixed to a seabed, and then a wind driven generator is fixed to the top end of the tower and is located above a sea level to collect wind power to generate electricity. The diameter of the lowest end of the tower is 6.242 m, the diameter of the uppermost end of the tower is 4.170 m, the tower diameter is averagely 5.206 m, and the whole tower is 96 m tall. In other words, in order to make the single installed power reach 5 MW, the tower needs to be nearly 100 m tall and the maximum diameter should be greater than 6 m thus to be able to carry the generator with this power. Such a tower is 439 tons heavy, and the cost and the installation fee are extremely high. Due to the high cost, it may not be converted into true economic value. Even if it is to be applied on a large scale, it is further discouraged by the high cost.

By adopting wind power generation, even if the diameter of the whole impeller to be made to be 230 m, the impeller just has the generating capacity of 12 MW, but the corresponding tower height needs to be 195 m (the lowest end of a blade is 30 m from the ground and the radius of the impeller is 165 m). However, if tidal current energy is utilized to generate electricity, the diameter of the blade only needs to be made to be 70 m, and the generating capacity of 30 MW may be reached theoretically. The pile only needs to be made to be 40 m high (the blade is 5 m from the ground, and the radius of the impeller is 35 m). Thus, compared with the offshore wind power generation, the tidal current energy generation greatly reduces the height of the tower and lowers the cost, and the power generation efficiency by utilizing the tidal current energy is far higher than that of power generation by utilizing the offshore wind energy.

A conventional tidal current energy generating device usually has two fixing modes: floating fixation, namely, it floats in the sea through a floating bed or is fixed to the seabed or both sides through steel ropes; and seabed fixation, namely, it is directly fixed to the seabed through a fixed pile. As the floating fixation still generates electricity by utilizing the wave energy, the generated power is relatively low compared with the generated power by utilizing the tidal current energy at depth. Further, the scale of the generator capable of being suspended is very small, and thus the economic value is small and the floating fixation is gradually abandoned in actual use. The seabed fixing mode is the fixing mode adopted by the existing tidal current energy generating device which is put into actual use.

At present, the maximum single installed power of a power generation module of the existing tidal current energy generating device which is put into actual use is 2 MW. Up to now, there are no successfully implemented cases with the single installed power exceeding 2 MW in the world. Limited by the scale of the single power generation module, most tidal current energy generating devices are extremely high in cost and cannot be put into commercial use truly, so that commercial value cannot be generated. Specifically speaking, the conventional tidal current energy generating device is similar with the offshore wind power generation apparatus and is directly fixed to the seabed through one fixed pile, too. As the seawater is huge in impact force, the fixed pile must have a large enough diameter to resist bending moments. The piling cost is higher if the diameter of the fixed pile is greater. As the tolerance of the fixed pile with a specific diameter has an upper limit value, the fixed pile can only bear the horizontal axis hydro-generator within a certain scale correspondingly. Both in terms of cost and technology, the fixed pile cannot be made larger indefinitely, so that the installed power of a single horizontal axis hydro-generator cannot be broken through.

SUMMARY

In order to overcome at least one deficiency in the prior art, the present invention provides a large tidal current energy generating device and an assembly platform thereof.

In a first aspect, the present invention provides an assembly platform of a large tidal current energy generating device. The assembly platform has at least one horizontal axis hydro-generator installed therein. The assembly platform of the large tidal current energy generating device includes at least four fixed piles, at least two force-bearing blocks, at least two force-bearing supports, and supports. The at least four fixed piles are connected through the supports to form an installation space. The at least one horizontal axis hydro-generator is installed inside the installation space, one end of each of the fixed piles is driven to be fixed to a seabed and the other end of each of the fixed piles extends to be above a water surface, the at least four fixed piles are arranged in left and right columns relative to a water flow direction, and at least two fixed piles in each column are arranged in sequence along the water flow direction. The at least two force-bearing blocks are fixed to the corresponding fixed piles or supports and located on left and right sides of the at least one horizontal axis hydro-generator below the water surface, respectively. Ends of the at least two force-bearing supports are respectively mounted on the left and right sides of the at least one horizontal axis hydro-generator relative to the water flow direction and other ends of the at least two force-bearing supports are respectively against the corresponding force-bearing blocks so as to resist an impact force of a water flow on the at least one horizontal axis hydro-generator.

In an embodiment of the first aspect of the present invention, the assembly platform further includes at least two groups of shock absorbers, and each group of the shock absorbers is arranged between the force-bearing supports and the force-bearing blocks.

In an embodiment of the first aspect of the present invention, the assembly platform further includes at least two guiding grooves, respectively disposed on the corresponding fixed piles or supports and located on the left and right sides of the horizontal axis hydro-generator relative to the water flow direction. One end of each of the guiding grooves is located above the water surface, and the other end is led to below the water surface. The at least two force-bearing blocks are fixed to the other ends of the corresponding guiding grooves, respectively.

In an embodiment of the first aspect of the present invention, the assembly platform further includes at least two groups of barrier guiding slots for mounting or fixing barriers, the at least two groups of barrier guiding slots are respectively arranged on upstream and downstream sides of the at least one horizontal axis hydro-generator, and each group of the barrier guiding slots is led to a position below the water surface from a position above the water surface.

In an embodiment of the first aspect of the present invention, the assembly platform further includes at least one personnel passage, and one end of the at least one personnel passage is located above the water surface and the other end communicates with the horizontal axis hydro-generator, one of the force-bearing supports, or one of the force-bearing blocks, enabling people to reach below the water surface through the at least one personnel passage to perform maintaining or fixing operations.

In an embodiment of the first aspect of the present invention, the assembly platform further includes at least one air blower and a ventilation duct. The ventilation duct is fixedly or detachably arranged along an inner side of the personnel passage or an outer side of the personnel passage, and the ventilation duct passes from a position above the water surface to a position below the water surface to enable air in a working area to be exchanged under the water surface.

In an embodiment of the first aspect of the present invention, the assembly platform further includes at least one water pump and at least one drain pipe. The at least one drain pipe is fixedly or detachably arranged along the inner side of the personnel passage or the outer side of the personnel passage, the at least one drain pipe passes from a position above the water surface to a position below the water surface, such that the water pump pumps accumulated water in the working area under the water surface to discharge the water to be above the water surface by the drain pipe.

In an embodiment of the first aspect of the present invention, the assembly platform further includes at least two fixing assembly boxes, and each of the fixing assembly boxes is disposed corresponding to the force-bearing blocks and is of a hollow structure, enabling people to enter the fixing assembly boxes to work.

In an embodiment of the first aspect of the present invention, each of the fixing assembly boxes includes a sealing device and a fixing assembly. The fixing assembly includes at least one fixing bolt or at least one jack, and the sealing device is correspondingly disposed at the fixing assembly.

In an embodiment of the first aspect of the present invention, an area of each of the fixed piles of the assembly platform above a lowest water level is provided with a concrete protector.

In an embodiment of the first aspect of the present invention, a side of each column of the fixed columns facing the horizontal axis hydro-generator is provided with a side plate.

In an embodiment of the first aspect of the present invention, the large tidal current energy generating device includes barriers as provided in the fourth aspect of the present invention.

In a second aspect, the present invention further provides a large tidal current energy generating device, including the assembly platform according to any one embodiment in the first aspect, at least one horizontal axis hydro-generator and at least one suspending support. The at least one horizontal axis hydro-generator is separably installed inside the assembly platform. The at least one suspending support is of an airtight hollow structure, and one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

In an embodiment of the second aspect of the present invention, the large tidal current energy generating device includes at least one connector, and the at least one connector is laterally or vertically connected with one end of the suspending support above the water surface and the assembly platform.

In an embodiment of the second aspect of the present invention, the assembly platform further includes at least two fixing assembly boxes, and each of the fixing assembly boxes is disposed corresponding to the force-bearing blocks and is of a hollow structure. At least two suspending supports are provided, and the other ends of the at least two suspending supports communicate with the corresponding fixing assembly boxes, respectively, enabling people to enter the fixing assembly boxes through the suspending supports.

In an embodiment of the second aspect of the present invention, at least three suspending supports are provided, the other ends of two suspending supports communicate with the force-bearing blocks or the force-bearing supports located on two sides of the horizontal axis hydro-generator, the other end of the other suspending support communicates with the horizontal axis hydro-generator, and the ends of the three suspending supports above the water surface are connected with each other.

In an embodiment of the second aspect of the present invention, the large tidal current energy generating device includes barriers as provided in the fourth aspect of the present invention.

In a third aspect, the present invention further provides a tidal current energy generating device, including:

at least two assembly platforms, wherein the assembly platform includes at least four fixed piles, the at least four fixed piles are connected integrally through the supports to form an installation space, one end of each of the fixed piles is driven to be fixed to a seabed and the other end extends to be above a water surface, the at least four fixed piles are arranged in left and right columns sequentially relative to a water flow direction and at least two fixed piles in each column are arranged sequentially along the water flow direction; and at least three horizontal axis hydro-generators, wherein at least one horizontal axis hydro-generator is installed inside the installation space of each of the assembly platforms;

wherein at least two assembly platforms are arranged left and right relative to the water flow direction, and a spacing between the two assembly platforms is matched with the impeller diameter of one horizontal axis hydro-generator, so that at least one additional horizontal axis hydro-generator can be installed between the two assembly platforms.

In an embodiment of the third aspect of the present invention, each of the assembly platforms includes at least two force-bearing blocks and at least two force-bearing supports. The at least two force-bearing blocks are fixed to the corresponding fixed piles or supports and located on left and right sides of the at least one horizontal axis hydro-generator below the water surface, respectively. Ends of the at least two force-bearing supports are respectively mounted on the left and right sides of the at least one horizontal axis hydro-generator relative to the water flow direction and other ends of the at least two force-bearing supports are respectively against the corresponding force-bearing blocks so as to resist an impact force of a water flow on the at least one horizontal axis hydro-generator.

In an embodiment of the third aspect of the present invention, each of the assembly platforms further includes at least two groups of shock absorbers, and each group of the shock absorbers is arranged between the force-bearing supports and the force-bearing blocks.

In an embodiment of the third aspect of the present invention, each of the assembly platforms further includes at least two guiding grooves, respectively disposed on the corresponding fixed piles or supports and located on the left and right sides of the horizontal axis hydro-generator relative to the water flow direction. One end of each of the guiding grooves is located above the water surface, and the other end is led to below the water surface. The at least two force-bearing blocks are fixed to the other ends of the corresponding guiding grooves, respectively.

In an embodiment of the third aspect of the present invention, each of the assembly platforms further includes at least two groups of barrier guiding slots for mounting or fixing barriers, the at least two groups of barrier guiding slots are respectively arranged on upstream and downstream sides of the at least one horizontal axis hydro-generator, and each group of the barrier guiding slots is led to a position below the water surface from a position above the water surface.

In an embodiment of the third aspect of the present invention, each of the assembly platforms further includes at least one personnel passage, and one end of the at least one personnel passage is located above the water surface and the other end communicates with the horizontal axis hydro-generator, one of the force-bearing supports, or one of the force-bearing blocks, enabling people to reach below the water surface through the at least one personnel passage to perform maintaining or fixing operations.

In an embodiment of the third aspect of the present invention, each of the assembly platforms further includes at least one air blower and a ventilation duct. The ventilation duct is fixedly or detachably arranged along an inner side of the personnel passage or an outer side of the personnel passage, and the ventilation duct passes from a position above the water surface to a position below the water surface to enable air in a working area to be exchanged under the water surface.

In an embodiment of the third aspect of the present invention, each of the assembly platforms further includes at least one water pump and at least one drain pipe. The at least one drain pipe is fixedly or detachably arranged along the inner side of the personnel passage or the outer side of the personnel passage, the at least one drain pipe passes from a position above the water surface to a position below the water surface, such that the water pump pumps accumulated water in the working area under the water surface to discharge the water to be above the water surface by the drain pipe.

In an embodiment of the third aspect of the present invention, each of the assembly platforms further includes at least two fixing assembly boxes, and each of the fixing assembly boxes is disposed corresponding to the force-bearing blocks and is of a hollow structure, enabling people to enter the fixing assembly boxes to work.

In an embodiment of the third aspect of the present invention, each of the assembly platforms further includes a sealing device and a fixing assembly. The fixing assembly includes at least one fixing bolt or at least one jack, and the sealing device is correspondingly disposed at the fixing assembly.

In an embodiment of the third aspect of the present invention, a side of each column of the fixed columns facing the horizontal axis hydro-generator is provided with a side plate.

In an embodiment of the third aspect of the present invention, an area of each of the fixed piles of the assembly platform above a lowest water level is provided with a concrete protector.

In an embodiment of the third aspect of the present invention, the large tidal current energy generating device further includes at least one suspending support. The at least one suspending support is of an airtight hollow structure, and one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

In an embodiment of the third aspect of the present invention, the large tidal current energy generating device includes at least one connector, and the at least one connector is laterally or vertically connected with one end of the suspending support above the water surface and the assembly platform.

In an embodiment of the third aspect of the present invention, the assembly platform further includes at least two fixing assembly boxes, and each of the fixing assembly boxes is disposed corresponding to the force-bearing blocks and is of a hollow structure. At least two suspending supports are provided, and the other ends of the at least two suspending supports communicate with the corresponding fixing assembly boxes, respectively, enabling people to enter the fixing assembly boxes through the suspending supports.

In an embodiment of the third aspect of the present invention, at least three suspending supports are provided, the other ends of two suspending supports communicate with the force-bearing blocks or the force-bearing supports located on two sides of the horizontal axis hydro-generator, the other end of the other suspending support communicates with the horizontal axis hydro-generator, and the ends of the three suspending supports above the water surface are connected with each other.

In an embodiment of the third aspect of the present invention, the large tidal current energy generating device includes barriers as provided in the fourth aspect of the present invention.

In a fourth aspect, the present invention further provides a tidal current energy generating device, including at least two barriers which are respectively arranged on upstream and downstream sides of the horizontal axis hydro-generator, a width of each of the barriers along a water flow direction being greater than or equal to 8 cm.

In an embodiment of the fourth aspect of the present invention, the tidal current energy generating device includes the assembly platform according to any one embodiment in the first or second aspect.

In an embodiment of the fourth aspect of the present invention, the tidal current energy generating device includes the suspending support according to any one embodiment in the second aspect.

In an embodiment of the fourth aspect of the present invention, the tidal current energy generating device adopts the tidal current energy generating device according to any one embodiment in the third aspect.

In a fifth aspect, the present invention further provides a tidal current energy generating device, including:

an assembly platform, fixed onto a seabed;

at least one horizontal axis hydro-generator, separably disposed inside the assembly platform;

at least two force-bearing blocks, disposed at the assembly platform and located below the water surface;

at least two force-bearing supports, wherein ends of the at least two force-bearing supports are respectively mounted on the left and right sides of the at least one horizontal axis hydro-generator relative to the water flow direction, and other ends of the at least two force-bearing supports are respectively against the corresponding force-bearing blocks so as to resist an impact force of a water flow on the at least one horizontal axis hydro-generator;

at least one personnel passage, one end of the at least one personnel passage communicates with an interior of the horizontal axis hydro-generator and the other end is located above the water surface, or one end is led to a working area of the assembly platform below the water surface and the other end is led to above the water surface, enabling people enter the working area below the water surface to work;

at least one air blower; and at least one ventilation duct, wherein the ventilation duct is fixedly or detachably arranged along an inner side or outer side of the personnel passage, one end of the ventilation duct is led to above the water surface and the other end is led to below the water surface, when people need to enter the working area below the water surface to work, the blower is activated to exchange the air in the working area below the water surface to ensure the safety of staff life.

In an embodiment of the fifth aspect of the present invention, at least one water pump and at least one drain pipe are further included. The at least one drain pipe is fixedly or detachably arranged along the inner side of the personnel passage or the outer side of the personnel passage. One end of the drain pipe is led to above the water surface and the other end is led to the working area below the water surface. When water leaks inside the working area below the water surface, the water pump extracts the inside accumulated water and discharges it above the water surface through the drain pipe to safeguard the life of equipment or staff.

In an embodiment of the fifth aspect of the present invention, the large tidal current energy generating device includes barriers as provided in any embodiment of the fourth aspect of the present invention.

To sum up, according to the present invention, the four fixed columns and the supports are connected together to form the installation space, and then the horizontal axis hydro-generator is fixed in the installation space rather than being installed inside a frame in the prior art, thereby greatly reducing the use of steel and lowering the manufacturing and installation costs. Furthermore, by arranging the force-bearing supports and the force-bearing blocks on two sides of the horizontal axis hydro-generator, a thrust of the water flow suffered by the horizontal axis hydro-generator can be transmitted to two sides in a balanced manner, so as to disperse the thrust to the whole assembly platform, and therefore the whole assembly platform may bear a single horizontal axis hydro-generator with a higher power, which greatly reduces the power generation cost of the tidal current energy generating device. In particular, the horizontal axis hydro-generator of the present invention has "fixing points" in the water, so that a problem that the horizontal axis hydro-generator is easily damaged due to a resonance phenomenon as a result of shaking under the action of the huge thrust of the water flow in the prior art. By adopting the large tidal current energy generating device and the assembly platform thereof provided by the present disclosure, the tidal current energy generating device can be truly made large-scale, and the cost of tidal current energy power generation can be reduced to be lower than the cost of thermal power generation, thereby truly realizing commercial popularization and application of tidal current energy power generation.

In order to make the above and other objects, features and advantages of the present invention more obvious and understandable, the following is a detailed description of the preferred embodiments, together with the accompanying drawings.

DETAILED DESCRIPTION OF THE INVENTION

Figure 1:
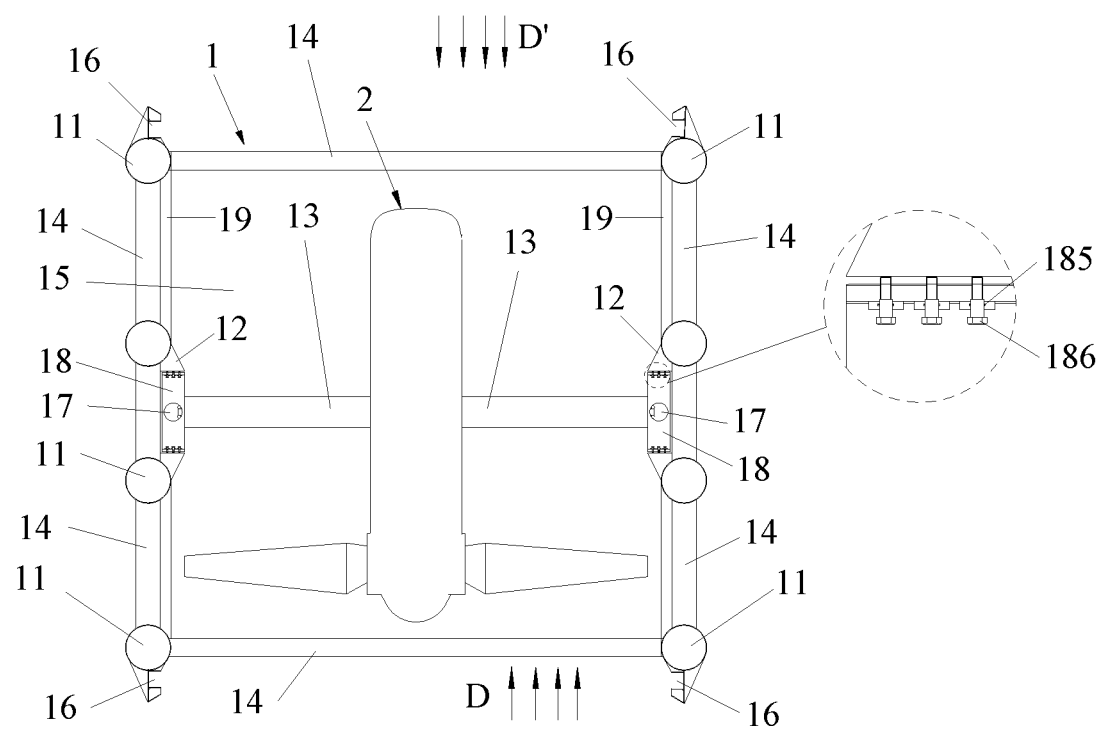
FIG. 1 is a top view of a large tidal current energy generating device according to a first embodiment of the present invention.
Figure 2:
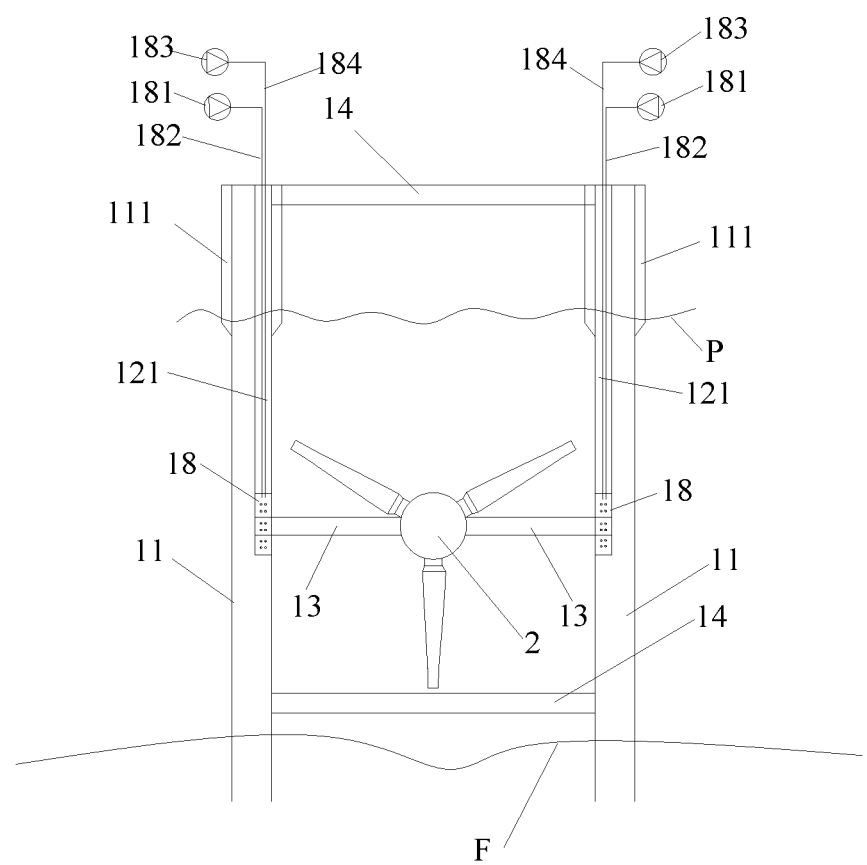
FIG. 2 is a side view of the large tidal current energy generating device according to the first embodiment of the present invention.
Figure 3:
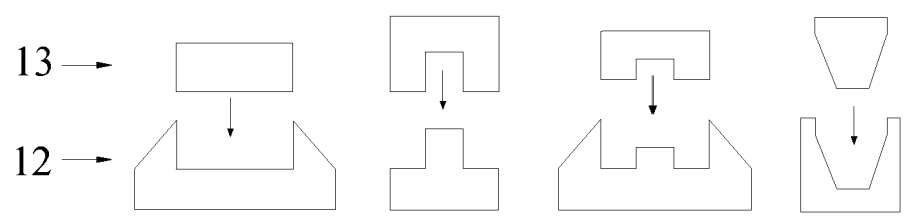
FIG. 3 are cross-section schematic diagrams showing force-bearing supports and force-bearing blocks provided in different embodiments.
Figure 4:
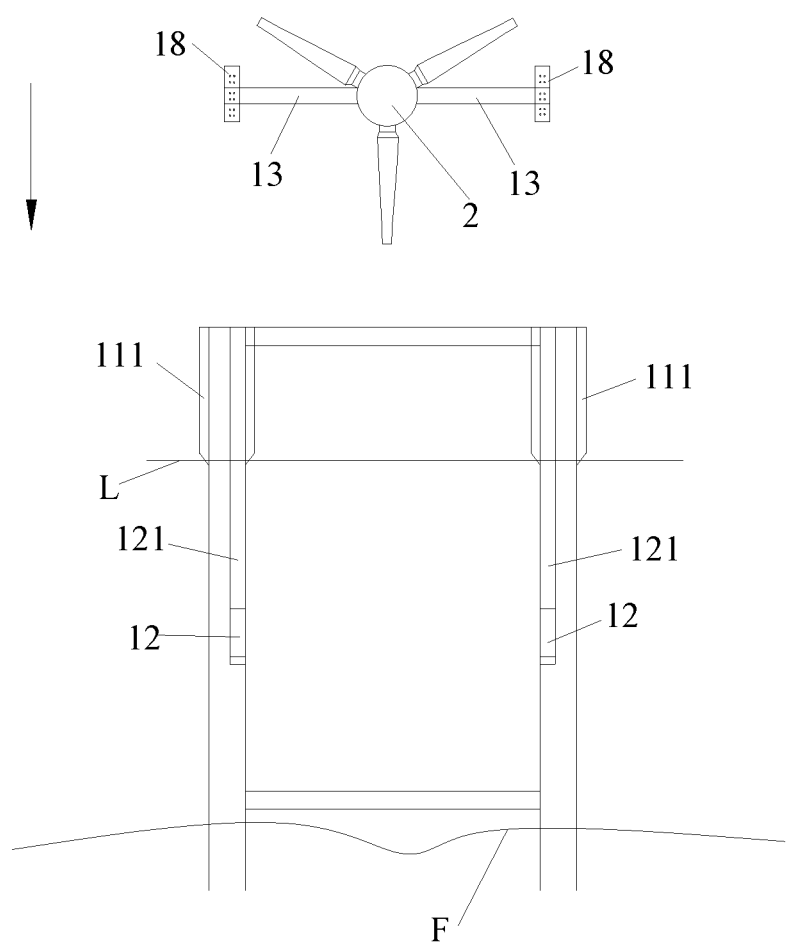
FIG. 4 is a schematic diagram showing the installation of the large tidal current energy generating device according to the first embodiment of the present invention.

FIG. 1 is a top view of a large tidal current energy generating device according to a first embodiment of the present invention. FIG. 2 is a side view of the large tidal current energy generating device according to the first embodiment of the present invention. FIG. 3 are cross-section schematic diagrams showing force-bearing supports and force-bearing blocks provided in different embodiments. FIG. 4 is a schematic diagram showing the installation of the large tidal current energy generating device according to the first embodiment of the present invention. A dashed line circle at the right of FIG. 1 is an enlarged schematic diagram of the part marked by the dashed line circle at the left. As shown in FIG. 1 to FIG. 4, in the first embodiment, the large tidal current energy generating device includes an assembly platform 1 and at least one horizontal axis hydro-generator 2, and the at least one horizontal axis hydro-generator 2 is installed inside the assembly platform 1.

In the embodiment, the assembly platform 1 includes at least four fixed piles 11, at least two force-bearing blocks 12, at least two force-bearing supports 13, and supports 14. One end of each of the fixed piles 11 is driven to be fixed to a seabed F and the other end of the fixed pile extends to be above a water surface P. The at least four fixed piles 11 are connected integrally through the supports 14, and the four fixed piles 11 together with the supports 14 enclose to form an installation space 15. The four fixed piles 11 are arranged in left and right columns relative to a water flow direction D, and in each column, at least two fixed piles 11 are arranged sequentially along the water flow direction D. Specifically speaking, the at least four fixed piles 11 are divided into two groups (i.e., two columns), and each group includes at least two fixed piles 11. The line by connecting the center points of the cross sections of the at least two fixed pile 11 in each group is substantially parallel to the water flow direction D (a slight deviation is allowed). As each group of fixed piles 11 is arranged in a column parallel to the water flow direction D, the impact force of the water flow acted to the fixed pile 11 located at the downstream can be greatly reduced after being blocked by the fixed pile 11 located at the upstream. As shown in FIG. 1, when the tide is rising, the water flow direction is D, and when the tide is falling, the water flow direction is turned to D'. "Left" and "right" mentioned herein are left and right sides relative to the water flow direction. In detail, viewed from the perspective shown in FIG. 1, i.e., viewed from the top of the water surface, the two columns of fixed piles 11 are respectively located on the left side and the right side.

In the embodiment, the supports 14 includes a plurality of rigid rod members, and each of the rigid rod members is connected with two fixed piles 11. The force sustained by the whole assembly platform 1 is transmitted between the fixed piles 11 via the supports 14 to be decomposed. By arranging the supports 14, the at least four fixed piles 11 together form a whole, and the force sustained by a single fixed pile 11 can be transmitted to other fixed piles 11 effectively, so that the force borne by the whole assembly platform 1 is distributed in a balanced manner. In the embodiment, an underwater portion and an above-water portion of the fixed pile 11 are provided with the supports 14 for connection. When the sea area where the tidal current energy generating device is located is relatively deep, the fixed piles 11 are relatively long, and a plurality of supports 14 may be disposed underwater. Thus, the fixed piles 11 can be connected more firmly, and the force can be dispersed more effectively. However, the present application is not limited thereto, and the connecting positions and connecting quantity of the supports 14 may be arranged according to specific demands.

In an actual application, each of the fixed piles 11 does not have to be installed exactly perpendicular to the seabed F. In the embodiment, the fixed piles 11 located on the upstream side or the backstream side (i.e., the lowest side and the uppermost side shown in FIG. 1) may be inserted into the seabed F obliquely. The capacity of each of the obliquely inserted fixed piles 11 to resist the impact force of the water flow is about 1.5 times of that of the perpendicularly arranged fixed pile. That is, the obliquely inserted fixed pile 11 can bear and disperse a larger impact force of the water flow.

In the embodiment, the assembly platform 1 of the large tidal current energy generating device may totally include eight fixed piles 11, four fixed piles 11 being located on the left side of the horizontal axis hydro-generator 2 and the other four fixed piles 11 being located on the right side of the horizontal axis hydro-generator 2. The four fixed piles 11 located on the left side or the right side are sequentially arranged along the water flow direction D. The specific quantity of the fixed piles 11 is not limited in the present invention. In other embodiments, the quantity of the fixed piles may be 4, 6, or 12. By arranging more fixed piles 11, the impact force brought by the water flow to the horizontal axis hydro-generator 2 can be transmitted to more fixed piles 11, and thus the impact force of the water flow can be dispersed more effectively, thereby allowing the whole tidal current energy generating device to withstand and resist a greater thrust of the water flow. Therefore, the capacity of the assembly platform 1 to carry the single horizontal axis hydro-generator 2 in a larger scale is further improved. In other words, the assembly platform 1 provided by the embodiments of the present invention can support the horizontal axis hydro-generator 2 with higher power, and the upper limit of the power of a single water turbine impeller and a single generator is increased, so that the commercial popularization and application of the tidal current energy generating device are realized. In addition, with the increase of the quantity of the fixed piles 11, the diameter of each fixed pile 11 can be reduced correspondingly, thereby reducing the cross-sectional area of each fixed pile 11 blocking the water flow and improving the utilization ratio of the water flow by the horizontal axis hydro-generator 2. Therefore, the power generation efficiency of the horizontal axis hydro-generator 2 is improved.

Specifically speaking, by taking an existing offshore wind power generation apparatus in the background art of the application as an example, the maximum single installed power capable of being carried by the apparatus is 5 MW, and fixed piles with a maximum diameter greater than 6 m are required to bear the load. However, in this embodiment, the at least four fixed piles 11 and the supports 14 form a whole to disperse the thrust of the water flow, and each fixed pile only needs to be 1.3 m in diameter to carry the horizontal axis hydro-generator with the single installed power of 5 MW. Thus, the diameter of each fixed pile can be reduced significantly. The manufacturing difficulty and cost of each fixed pile can be reduced accordingly. In addition, the installation process of fixing the single fixed pile to the seabed is quite tedious. During the installation process, a piling platform formed by multiple auxiliary piles needs to be disposed around the single fixed pile at first, and after the single fixed pile is installed and fixed, people and ships are sent to remove the auxiliary piling platform, and even underwater operations are involved, which results in very high installation costs for the fixed piles. However, this embodiment adopts at least four fixed piles connected one another to form a natural piling platform. No additional auxiliary piling platform is required, thereby greatly reducing the installation cost of the fixed piles. Thus, the sum of the manufacturing cost and the installation cost of the four fixed piles with the diameter of 1.3 m is far lower than those of the fixed pile with the diameter of 6 m.

If each fixed pile in the embodiment is made to be 3 m in diameter, the horizontal axis hydro-generator with the installed power reaching up to 20 MW can be carried, which breaks through the upper limit of the existing single installed power, thereby increasing the single installed power truly. The maximum single installed power of the existing tidal current energy generating device is only 2 MW. In order to achieve the generating capacity of 20 MW, up to ten horizontal axis hydro-generators need to be operated, and at least ten assembly platforms need to be arranged for installation. For the large tidal current energy generating device in the first embodiment of the present invention, only one horizontal axis hydro-generator and one assembly platform need to be disposed to achieve the generating capacity of 20 MW, which significantly reduces the cost, and therefore, makes commercial application of the tidal current energy generating device truly possible.

The cost of the tidal current energy generating device substantially consists of two parts: the manufacturing cost and the installation cost of the generator; and the manufacturing cost and the installation cost of the assembly platform. For example, the manufacturing cost and the installation cost of a 2.5 MW horizontal axis hydro-generator are 20 million yuan, the manufacturing cost and the installation cost of two 2.5 MW horizontal axis hydro-generators are 40 million yuan, while the manufacturing cost and the installation cost of one 5 MW horizontal axis hydro-generator are only 26 million yuan. In other words, without considering the difference between the manufacturing cost and the installation cost of the assembly platform, as far as the cost of the horizontal axis hydro-generator is concerned, the cost of per kilowatt-hour will be reduced greatly by operating the horizontal axis hydro-generator with a higher power. Needless to say, the manufacturing cost and the installation cost of the assembly platform of the embodiment are far lower than those of the assembly platform in the prior art.

In the embodiment, at least two force-bearing blocks 12 are fixed to the fixed piles 11 or the supports 14, and the force-bearing blocks 12 are located below the water surface P and are located on the left and right sides of the horizontal axis hydro-generator 2 relative to the water flow direction D. In detail, the assembly platform of the large tidal current energy generating device in the embodiment includes eight fixed piles, and as shown in FIG. 1, two force-bearing blocks 12 are respectively disposed on the two fixed piles 11 in the middle on the left and the two fixed piles 11 in the middle on the right and are located on the sides of the fixed piles 11 facing the horizontal axis hydro-generator 2. If the tidal current energy generating device only includes four fixed piles, the force-bearing blocks 12 can be mounted to the supports connecting two fixed piles. In other words, the force-bearing blocks 12 may be mounted directly or indirectly to the fixed piles 11.

In the embodiment, one ends of the at least two force-bearing supports 13 are respectively mounted on the left and right sides of the horizontal axis hydro-generator 2 relative to the water flow direction D, and the other ends thereof are respectively against the corresponding force-bearing blocks 12. In the embodiment, by taking the force-bearing support 13 located on the left side in FIG. 1 as an example, one end of the force-bearing support 13 refers to the right end and the other end of the force-bearing support 13 refers to the left end. By taking the force-bearing support 13 located on the right side in FIG. 1 as an example, one end of the force-bearing support 13 refers to the left end and the other end of the force-bearing support 13 refers to the right end.

The force-bearing supports 13 and the force-bearing blocks 12 in the embodiment are combined to resist the impact force of the water flow onto the horizontal axis hydro-generator 2. In detail, as shown in FIG. 1, the water flow rushes to the horizontal axis hydro-generator 2 from bottom to top along the water flow direction D. As one ends of the two force-bearing supports 13 are respectively fixed to two sides of the horizontal axis hydro-generator 2, the thrust force of the water flow to the horizontal axis hydro-generator 2 can be directly transferred and decomposed towards two sides. The thrust force is distributed to each of the fixed piles 11 in a balanced manner successively through the force-bearing supports 13, the force-bearing blocks 12, and the supports 14, and all the fixed piles 11 are subjected to the force jointly. Meanwhile, as the other ends of the two force-bearing supports 13 are respectively "blocked" by the force-bearing blocks 12 and the force-bearing blocks 12 are fixed to the supports 14 or the fixed piles 11, the force-bearing blocks 12 can generate a "resisting force" from top to bottom viewed from the perspective of FIG. 1 to the force-bearing supports 13, and the effects generated among different forces are counteracted to achieve a balance so as to further ensure the stability of the horizontal axis hydro-generator 2 in the water, thereby improving the upper limit at which the horizontal axis hydro-generator 2 can withstand the thrust of the water flow.

In the prior art, the horizontal axis hydro-generator is fixed to the seabed through a single carrying pile, and the single carrying pile bears all the impact force of the water flow to the horizontal axis hydro-generator. The bending moment and the shearing force generated in the process are very large. In order to ensure that the carrying pile is not overloaded, an upper limit is set for the scale of the single installed horizontal axis hydro-generator. However, in the assembly platform of the embodiment, at least two force-bearing points are arranged at the "waist" of the whole power generation device, so that the impact force of the water flow to the horizontal axis hydro-generator is dispersed laterally effectively. As the tidal current energy generating device generates electricity by means of kinetic energy of the water flow, the larger the thrust of the water flow is, the larger the generating capacity is. Therefore, the tidal current energy generating device of the embodiment can carry the horizontal axis hydro-generator with a higher power.

In the embodiment, the cross-section of the force-bearing block 12 is concave. However, the invention is not limited thereto. In other embodiment, the cross-section of the force-bearing block 12 may be convex or conical. The invention does not limit the specific shapes of the force-bearing block 12 and the force-bearing support 13, and the force-bearing block 12 only needs to form an engagement relationship with one end of the force-bearing support. FIG. 3 briefly illustrates some possible shapes of the cross-sections of the force-bearing block 12 and the force-bearing support 13. However, the actual shapes of the force-bearing block 12 and the force-bearing support 13 of the present invention are not limited thereto. In actual applications, the force-bearing support 13 preferably has a curved or otherwise shaped streamlined appearance. With this setup, the resistance of the force-bearing support 13 in the water is minimized.

The force-bearing blocks 12 and the force-bearing supports 13 of the embodiment may be fixed via jacks or fixing bolts. However, the invention is not limited thereto. In another embodiment, the force-bearing blocks 12 and the other ends of the force-bearing supports 13 may achieve an interference fit. Specifically speaking, when the force-bearing supports 13 are mounted to the force-bearing blocks 12, no additional jacks or fixing bolts are required to firmly engage the force-bearing supports 13 and the force-bearing blocks 12, and the two are fixed without being loosened. The installation does not require an installation staff to go underwater for installation, so that there is no need to arrange a personnel passage additionally. In this case, the manufacturing precision of the force-bearing blocks 12 and the force-bearing supports 13 is high, and the cross sections of the force-bearing supports 13 can be set to specific shapes, so that the force-bearing supports 13 can be engaged firmly to the force-bearing blocks 12 (e.g., the shape shown on the far right in FIG. 3). The impact of the water flow is very huge, and for the force-bearing blocks and the force-bearing supports located on the left and right sides, once the accuracy of either side is not matched, the horizontal axis hydro-generator tilts easily. The advantage is that the connection between the force-bearing blocks and the force-bearing supports during the installation process only relies on the engagement relationship and does not require additional re-fixing and adjustment. In the case where the force-bearing blocks and the force-bearing supports are fixed by the engagement relationship, jacks may be disposed under the force-bearing supports, and when the horizontal axis hydro-generator needs to be lifted out of the water from bottom to top, only the jacks need to be operated to lift the force-bearing supports to release the engagement of the force-bearing supports and the force-bearing blocks, so that the horizontal axis hydro-generator can be lifted out of the water.

In the embodiment, the number of the force-bearing blocks 12 and the number of the force-bearing supports 13 are both two. However, the invention is not limited thereto. In other embodiments, the number of the force-bearing blocks and the number of the force-bearing supports may both be four, and the horizontal axis hydro-generator may have two force-bearing blocks and two force-bearing supports on the left side and two force-bearing blocks and two force-bearing supports on the right side relative to the water flow direction. In another embodiment, the number of the force-bearing supports 13 may be two, and the number of the force-bearing blocks 12 may be four, and every two force-bearing blocks 12 as one group are fixed to the other end of the force-bearing support. In the embodiment, a length direction of the force-bearing supports 13 is a direction perpendicular to the water flow direction D and parallel to the water surface P, so that not only can the steel consumption of the force-bearing supports 13 be reduced, but also can a bending moment generated by the force-bearing supports 13 be reduced. However, the invention is not limited thereto. In other embodiments, the length direction of the force-bearing supports may be perpendicular to the water flow direction, but may not be parallel to the water surface, i.e., the force-bearing supports may be obliquely disposed. The more obliquely the force-bearing supports 13 are disposed, the longer the length of the force-bearing supports 13 will be, and the larger the amount of steel consumption will be. The generated bending moment is increased, too. Therefore, the engaging ends of the force-bearing supports 13 and the force-bearing blocks 12 need to be arranged below the water surface.

In the embodiment, one ends of the two force-bearing supports 13 are directly mounted on a generator portion of the horizontal axis hydro-generator 2 and are located on the left and right sides. However, the invention is not limited thereto. In other embodiments, the horizontal axis hydro-generator may be provided with a suspending support, one ends of the two force-bearing supports 13 may be mounted to the suspending support and are still located on two sides of the horizontal axis hydro-generator 2. In other words, one ends of the force-bearing supports are directly or indirectly mounted to the horizontal axis hydro-generator 2 so as to decompose the force borne by the horizontal axis hydro-generator 2 towards two sides. Preferably, the closer the positions where the two force-bearing supports 13 are fixed to two sides of the horizontal axis hydro-generator 2 from the horizontal axis hydro-generator 2 are, the better the effect is. The farther the positions are, the weaker the role of decomposition and transmission of forces, while increasing the bending moment generated by the suspension support.

In an actual mounting process, the horizontal axis hydro-generator 2 and the force-bearing supports 13 are welded and fixed on shore and are assembled to form an internal module. The prototypes of the fixed piles 11, the supports 14, and the force-bearing blocks 12 are also welded and fixedly connected on shore, and then they are transferred to an installation water area. Piling operations (including but not limited to drilling holes in the seabed, driving the piles to be embedded in the bedrock layer, and filling concrete in the piles to form reinforced concrete infill piles) are performed on the at least four fixed piles 11, respectively, thus to complete the installation of the assembly platform 1. After that, the inner module is hung and lifted from the water surface into the installation space 15 of the assembly platform 1 from top to bottom, and then the force-bearing supports 13 and the force-bearing blocks 12 are fixed, which completes the installation of the whole tidal current energy generating device. In the embodiment, all manufacturing and installation actions of the tidal current energy generating device and the assembly platform thereof can be completed above the water surface, so that underwater operation is avoided, the construction difficulty is reduced, the safety of construction staff is improved, and the construction and installation costs are further lowered greatly.

With respective to how to fix each fixed pile 11 in the embodiment to the seabed F, a piling method disclosed by another Chinese patent (publication number CN105401564) invented by the present inventor may be used and other existing piling methods may be used, which is not described in detail herein. However, the invention is not limited thereto. It should be noted that only the piling method of the fixed piles in the embodiment may be identical to that disclosed in CN10540156, and the structure and the installation method of the whole tidal current energy generating device are essentially different from those disclosed in CN10540156.

First, the horizontal axis hydro-generator in CN10540156 invented by the present inventor is installed inside an internal frame at first, and then the internal frame is inserted into an outer frame. The steel consumption is increased greatly due to the arrangement of the internal frame and the outer frame, and the cost is increased greatly. After the tidal current energy generating device previously invented by the present inventor was put into actual applications, the inventor found that the thrust generated by the water flow is huge and unimaginable, and the thrust reaching up to 2000-3000 tons of force may be generated to the maximum extent. Therefore, the weight of the internal frame needs to be increased to increase the friction brought by its own gravity so as to offset against the thrust of the water flow to the hydro-generator, which leads to a sharp increase in the amount and cost of steel consumption. The present embodiment fully abandons the use of the frames. Except that a small amount of reinforcement cages is needed in the process of pouring concrete to form the fixed piles and the steel is used in the force-bearing supports, the force-bearing blocks and the supports, other parts of the entire assembly platform do not need steel at all. The steel consumption of the whole assembly platform is geometrically reduced, thereby significantly reducing the manufacturing costs.

It is found by the present inventor through actual application that by implementing the installation method and structure invented by the inventor previously, for the horizontal axis hydro-generator with the single installed scale of 200 KW, the diameter of the impeller is 5.4 m and the section of the impeller is 22.9 m². The hydro-generator will bear the thrust of 23 tons of forces of the water flow. At the time, the internal frame needs to reach up to more than 230 tons to guarantee safe operation of the hydro-generator. However, it is merely necessary to make the weight of the whole assembly platform of the tidal current energy generating device of the embodiment be 125 tons (it is actually only 25 tons of gravity in water if a buoyancy force generated by the hollow force-bearing supports, a hollow generator cabin and the like), so that the horizontal axis hydro-generator with the single installed scale of 1.5 MW may operate stably. The diameter of the impeller thereof is 15 m, the section of the impeller is 177 m², and the hydro-generator will bear the thrust of 177 tons of force of the water flow. If the installation method and structure invented by the inventor previously are adopted, it is necessary to bear the 1.5 MW horizontal axis hydro-generator with a frame reaching up to 1800 tons. The frame of the weight may not be realized fundamentally from the aspect of either technique or cost. Therefore, the problem of the frame limits enlargement of the existing single horizontal axis hydro-generator.

Second, the horizontal axis hydro-generators in CN10540156 are fixed to the uppermost side and the lowest side of the internal frame rotatably through a center rotating shaft. Under a huge thrust action of the water flow, the horizontal axis hydro-generators vibrate easily in the operating process. The larger the scale of the generator is, the more severe the vibration is. Components in the horizontal axis hydro-generator generate resonance as a result of severe vibration to be damaged. Therefore, after the tidal current energy generating device invented by the inventor previously is put into actual application, it is found that only 200 KW or 300 KW horizontal axis hydro-generator can operate safely by adopting the installation way in CN10540156. If the single scale reaches over 1 MW, the horizontal axis hydro-generator is easily damaged, so that the single scale of the horizontal axis hydro-generator may not be broken through. However, at least two "restraining points" are arranged at the waist or near the waist of the horizontal axis hydro-generator of the tidal current energy generating device provided by the embodiment. The horizontal axis hydro-generator is fixed to the force-bearing supports directly and firmly, then the force-bearing supports are further fixed with the force-bearing blocks firmly, and the force-bearing blocks and the supports are of fixed relations with the fixed piles firmly. In other words, the horizontal axis hydro-generator and the assembly platform are of a firm fixed relation, and no components vibrate beyond a safe range in water, so that the problem of resonance is avoided. Therefore, the tidal current energy generating device provided by the embodiment may operate the horizontal axis hydro-generator of a larger installed scale stably.

In the embodiment, the assembly platform 1 includes at least two guiding grooves 121, respectively located on the left and right sides of the horizontal axis hydro-generator 2 relative to the water flow direction D. The guiding grooves 121 leads from above the water surface to below the water surface, and the at least two force-bearing blocks 12 are fixed to the bottom ends of the corresponding guiding grooves 121, respectively. In the embodiment, the guiding grooves 121 may be provided on the corresponding fixed piles 11 or supports 14 and are located on the sides of the fixed piles 11 or supports 14 facing the horizontal axis hydro-generator 2. One end of the guiding groove 121 is located above the water surface P and the other end may be located at the same level as or further down than the center point of the horizontal axis hydro-generator 2. The guiding grooves 121 serve to facilitate the installation or fixation of the force-bearing supports 13. When installing the force-bearing supports 13, one ends of the force-bearing supports 13 can slide along the guiding grooves 121 from above the water to below the water and then are secured with the force-bearing blocks 12 located at the bottom of the guiding grooves 121.

In the embodiment, in order to reduce damage of ocean foreign matters (for example, ocean garbage or floating ice) to the horizontal axis hydro-generator 2 effectively, it is necessary to arrange barriers on the upstream and downstream sides of the horizontal axis hydro-generator 2. As a result of much ocean garbage, it is necessary to clean surface garbage periodically after the barriers are used for a period of time, so that it is ensured that the water flow swarms into the horizontal axis hydro-generator 2 smoothly all the time without being blocked by garbage, and therefore, the power generation efficiency is guaranteed. In addition, as the water flow is rapid and some garbage is relatively sharp, even if the barriers are manufactured by steel wires, the barriers are still be damaged, so that it is necessary to maintain and replace the barrier frequently. Staffs to clean, mount and maintain the barriers in the prior art must dive in water, so that the operating difficulty is high and the efficiency is low. Furthermore, as water flow collision around the tidal current energy generator causes a vortex easily, it is also dangerous to maintain and clean the generator.

In the embodiment, the assembly platform 1 further includes at least two groups of barrier guiding slots 16 for mounting or fixing the barriers, the two groups of barrier guiding slots 16 are respectively formed in upstream and downstream sides of the horizontal axis hydro-generator 2 (if the water flow direction is shown in D in FIG. 1, the lower side of FIG. 1 is upstream and the upper side of FIG. 1 is downstream), and each group of barrier guiding slots 16 is led to a position below the water surface from a position above the water surface. In the embodiment, each group of barrier guiding slots 16 includes two barrier guiding slots, one group of the barrier guiding slots 16 is located on one side of the upstream of the upstream two fixed piles 11 (the two lowest fixed piles in FIG. 1) in FIG. 1 and the other group of barrier guiding slots 16 is located on one side of the downstream of the downstream two fixed piles 11 (the two uppermost fixed piles in FIG. 1) in FIG. 1. In an actual application, the left and right side edges of the barriers may be inserted into the barrier guiding slots 16 from top to bottom along one group of barrier guiding slots 16 and then slide to the bottom end dependent on the gravity themselves, thereby completing mounting and fixation of the barriers. By arranging the barrier guiding slots 16, it is simpler to mount the barriers. It is unnecessary to perform the mounting operation in a sea, and sea surface operations are performed directly to mount the barriers. In particular, when it is necessary to clean or replace the barriers, the barriers may be pulled out from bottom to top along the barrier guiding slots 16, and staffs only need to operate on the water surface. Therefore, the barrier guiding slots 16 are arranged, so that is further convenient to clean and replace the barriers. By arranging the barrier guiding slots 16, the costs of mounting, maintaining and replacing the barriers are lowered. The specific types of the barriers are not defined herein.

In the embodiment, the assembly platform 1 includes at least one personnel passage 17, and the at least one personnel passage 17 is led to a position below the water surface from a position above the water surface, so that a person may arrive the position below the water surface through the personnel passage 17 to perform maintaining or fixing operations. One end of the personnel passage 17 is above the water surface P, and the other end thereof is below the water surface P to communicate with the horizontal axis hydro-generator 2, the force-bearing support 13 or the force-bearing block 12. In the embodiment, there are two personnel passages 17, and the two personnel passages 17 are disposed along the supports 14, respectively. In one embodiment, the personnel passages 17 may communicate with the force-bearing supports 13, respectively, and personnel can reach a position inside the force-bearing supports 13 through the personnel passages 17 to fix and mount the force-bearing supports 13 and the force-bearing blocks 12. However, the invention is not limited thereto. In other embodiments, the personnel passages 17 may be respectively disposed inside the fixed piles 11 on two sides of the horizontal axis hydro-generator 2 and communicate with the force-bearing supports 13 or the force-bearing blocks 12. In another embodiment, the personnel passages 17 may be disposed inside the supports 14.

In the embodiment, the two force-bearing supports 13 may be hollow structures, so that personnel can reach the interior of the horizontal axis hydro-generator 2 through the personnel passages 17 and the force-bearing supports 13 to perform maintenance operations (such as oil renewal, gear replacement, seal replacement, etc.) on the interior of the horizontal axis hydro-generator 2. However, the invention is not limited thereto. In other embodiments, the assembly platform may include only one personnel passage, and the personnel passage is also disposed inside the fixed pile. Personnel can reach the force-bearing support on one side through the personnel passage, and fix and mount the force-bearing support and the force-bearing block on one side. Personnel can also reach the interior of the horizontal axis hydro-generator through the force-bearing support, and perform maintenance operations on the horizontal axis hydro-generator. Personnel can also pass the force-bearing support on one side, the horizontal axis hydro-generator, and the force-bearing support on the other side in turn, and fix and mount the force-bearing support and the force-bearing block located on the other side. In another embodiment, the assembly platform may include only one personnel passage, the personnel passage may be disposed inside the fixed pile and may communicate with the force-bearing block, and installation staffs may reach a position inside the force-bearing block through the personnel passage and fix and mount the force-bearing support and the force-bearing block. In another embodiment, the assembly platform may be provided with a special personnel passage directly communicating with the interior of the horizontal axis hydro-generator from a position above the water surface.

In the embodiment, the assembly platform 1 further includes at least one air blower 181 and a ventilation duct 182. The ventilation duct 182 is fixedly or detachably arranged along an inner side of the personnel passage 17 or an outer side of the personnel passage 17, and the ventilation duct 182 is led to a position below the water surface from a position above the water surface P, so that a working area below the water surface P may be ventilated. The existing tidal current energy generating device has no regard for an underwater installation or maintaining condition. The inventor has considered underwater maintenance but ignored the problem that toxic and harmful gases are generated and the concentration of carbon dioxide is high as a result of high temperature generated by heating of the machine because the machine inside operates for a long time. If it is necessary to perform the underwater operation, the staffs need to stay underwater for a long time, and conditions such as anoxia or carbon dioxide poisoning are prone to occurring. The air blower 181 and the ventilation duct 182 of the embodiment form a fresh air system, which guarantees the life safety of maintenance staffs or installation staffs entering underwater. When the staffs need to enter the working area underwater to work, the air blower may be started to ventilate the working area below the water surface. In a specific application, the fresh air system has a more complex structure, for example, a blowing system and an exhausting system that are independent, which is not described in detail herein.

In the embodiment, the assembly platform 1 further includes at least one water pump 183 and at least one drain pipe 184. The drain pipe 184 is fixedly or detachably arranged along the inner side of the personnel passage 17 or the outer side of the personnel passage 17, the drain pipe 184 is led to a position below the water surface P from a position above the water surface P, and the water pump 183 pumps accumulated water in the working area below the water surface and discharges the water above the water surface through the drain pipe 184. As most of the whole tidal current energy generating device is located in water, after long-time operation, a seal ring is prone to loosening, so that it is hard to guarantee a condition that the seal ring is a leak. If there are no protection measures and the maintenance staffs or the installation staffs enter the underwater working area from the personnel passages 17, they may have a life risk. By arranging the water pump 183 and the drain pipe 184, the life safety of the staffs is guaranteed greatly. In the embodiment, before the staffs need to work underwater, the water pump 183 is started to operate for a period of time first, and whether accumulated water is discharged or not from the drain pipe 184 is observed. Only there is no obvious accumulated water discharged from the drain pipe 184, can the staffs enter the personnel passages 17. When the staffs work underwater, the water pump 183 keep working all the time until the staffs finish work and return above the water surface. However, the working form of the water pump is not defined herein. In other embodiments, the water pump 183 may operate periodically to extract accumulated water inside and discharge the accumulated water above the water surface through the drain pipe 184 so as to prevent the accumulated water from damaging components, and the life safety of the staffs is guaranteed.

In the embodiment, the ventilation duct 182, the drain pipe 184, and the personnel passages 17 may be disposed along the supports 14 or the fixed piles 11, and these pipes or tubes may all communicate with the interior of the force-bearing supports 13. Further, the ventilation duct 182 and the drain pipe 184 may be arranged along the hollow force-bearing support 13 all the way to the interior of the horizontal axis hydro-generator 2. However, the invention is not limited thereto. In other embodiments, specific ventilation duct 182, drain pipe 184 and personnel passages 17 may be arranged inside the fixed piles 11 from above the water to below the water.

In the embodiment, the assembly platform 1 further includes at least two fixing assembly boxes 18, and each of the fixing assembly boxes 18 is disposed corresponding to the force-bearing block 12. The fixing assembly boxes 18 are hollow structures, and personnel can enter the interior of the fixing assembly boxes 18 to work. The fixing assembly boxes 18 may be mounted at the ends of the force-bearing supports 13 against the force-bearing blocks 12 to securely connect the force-bearing blocks 12 to the force-bearing supports 13. In the embodiment, each of the fixing assembly boxes 18 communicates with the personnel passage 17. In other words, the personnel passages 17 of this embodiment directly communicate with the interior of the fixing assembly boxes rather than directly communicating with the force-bearing supports 13.

In the embodiment, each of the fixing assembly boxes 18 includes a sealing device 185 and a fixing assembly 186. The fixing assembly 186 includes at least one fixing bolt or at least one jack, and the sealing device 185 is correspondingly disposed at the fixing assembly 186. In a mounting process of the tidal current energy generating device of the embodiment, the horizontal axis hydro-generator 2, the at least two force-bearing supports 13, and the at least two fixing assembly boxes 18 are welded and connected on shore to form the internal module. After the fixed piles 11 are driven to be fixed to the seabed F, the internal module is hung into the installation space 15 in water from top to bottom, and the fixing assembly boxes 18 may slide into the bottom ends of the guiding grooves 121 along the guiding grooves 121. Then, the staffs enter the interior of the fixing assembly boxes 18 through the personnel passages 17, and the fixing assembly boxes 18 and the force-bearing blocks 12 are firmly engaged by adjusting the fixing assembly 186 (for example, tightening the fixing bolt or lifting with the jack), thereby securing the force-bearing blocks 12 and the force-bearing supports 13. So far, the whole internal module and the assembly platform 1 are fixed, and the whole tidal current energy generating device is mounted. However, the invention is not limited thereto. This embodiment may also work without the fixing assembly boxes 18, and may be directly provided with the sealing devices 185 and the fixing assemblies 186 to fix the force-bearing supports 13 and the force-bearing blocks 12 together.

When the water flow rushes towards the horizontal axis hydro-generator 2 along the water flow direction D, the force-bearing supports 13 are subjected to a huge impact from below to above as seen from the perspective of FIG. 1, and the fixing assembly boxes 18 are pushed against the upper side, as seen from the perspective of FIG. 1, of the force-bearing blocks 12. In an actual manufacturing process, it is hard to guarantee that the dimensions of the fixing assembly boxes 18 are exactly matched with the dimensions of the positioning slots of the force-bearing blocks 12. Due to the presence of tolerance, there will be gaps between the fixing assembly boxes and the force-bearing blocks 12. In order to avoid shaking of the horizontal axis hydro-generator 2, installation staffs may enter the interior of the fixing assembly boxes 18 through the personnel passages 17 to adjust the fixing assemblies 186 (for example, tightening the fixing bolt or lifting with the jack), so that the top of the fixing assemblies 186 is firmly against the inner wall of the positioning slots of the force-bearing blocks 12. At this point, the fixing assembly boxes 18 are jammed in the force-bearing blocks 12, thereby avoiding wobble of the horizontal axis hydro-generator 2. Regardless of the rising tide and the falling tide, the horizontal axis hydro-generator 2 are always firmly positioned without an oscillation phenomenon exceeding an acceptable range. In the process, the air blower 181 works all the time to feed fresh air from the ventilation duct 182. Further, the water pump 183 may work all the time too to discharge probable accumulated water from the discharge pipe 184, so that the life safety of the staffs is guaranteed. In other embodiments, if the fixing assembly boxes 18 are not provided, the personnel passages 17 may communicate directly with the interior of the force-bearing supports 13 or the force-bearing blocks 12, thus to fix and connect the force-bearing supports 13 and the force-bearing blocks 12.

In the embodiment, a side of each column of the fixed piles 11 facing the horizontal axis hydro-generator 2 is provided with a side plate 19. The side plates 19 can form a water channel to play a rectifying role, i.e., they can gather the water flow and better direct it to the horizontal axis hydro-generator 2, thereby improving the efficiency of the power generation. In another embodiment, as seen from the perspective of FIG. 2, the side plates may be arranged on upper, lower, left and right sides of the horizontal axis hydro-generator 2 so as to form the water channel to guide water to rush to the horizontal axis hydro-generator 2 in a centralized manner.

As shown in FIG. 4, in the embodiment, an area of each fixed pile 11 of the assembly platform 1 above the lowest water level L is provided with a concrete protector 111 to prevent each fixed pile 11 from not being corroded highly by an intertidal zone, so that the service life of the fixed pile 11 is prolonged greatly, the service life of the assembly platform 1 is therefore prolonged, and the maintenance frequency and cost are reduced. As water plays a role of isolating oxygen in air, the underwater portion of the fixed pile 11 is not easily corroded, and the portion of the fixed pile 11 located above the water surface is, on the contrary, corroded most likely. If the concretion protection apparatus is not arranged, once the portion of the fixed pile 11 above the water surface is corroded, a force between the fixed piles 11 is not transferred uniformly, which may probably cause unbalance and even collapse of the whole assembly platform 1. By arranging the concrete protector 111, the service life of the whole assembly platform 1 may be prolonged by 50 years. Following the rising tide and the falling tide, the height of the water surface P will be changed, so that the lowest end of the concrete protector 111 is preferably arranged at the lowest water level L. In an actual application, the lowest end of the concrete protector 111 may be lower than the lowest water level L. In a specific application, an area of the fixed pile 11 located above the lowest water level L is provided with a protecting cover, and then concrete is poured into the protecting cover to form the concrete protector 111.

Figure 5:
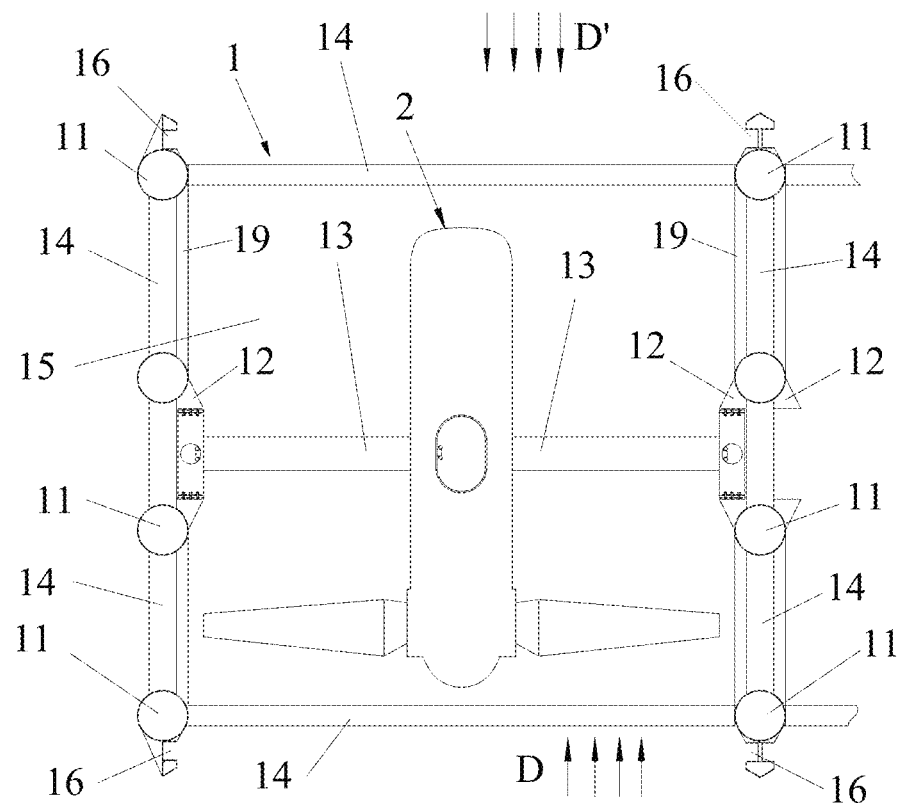
FIG. 5 is a top view showing a partial of a large tidal current energy generating device according to a second embodiment of the present invention.
Figure 6:
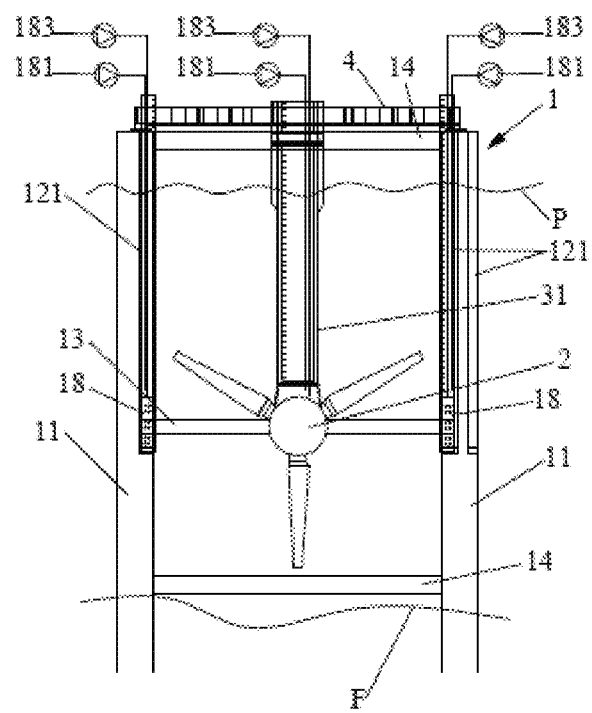
FIG. 6 is a side view showing a partial of the large tidal current energy generating device according to the second embodiment of the present invention.
Figure 7:
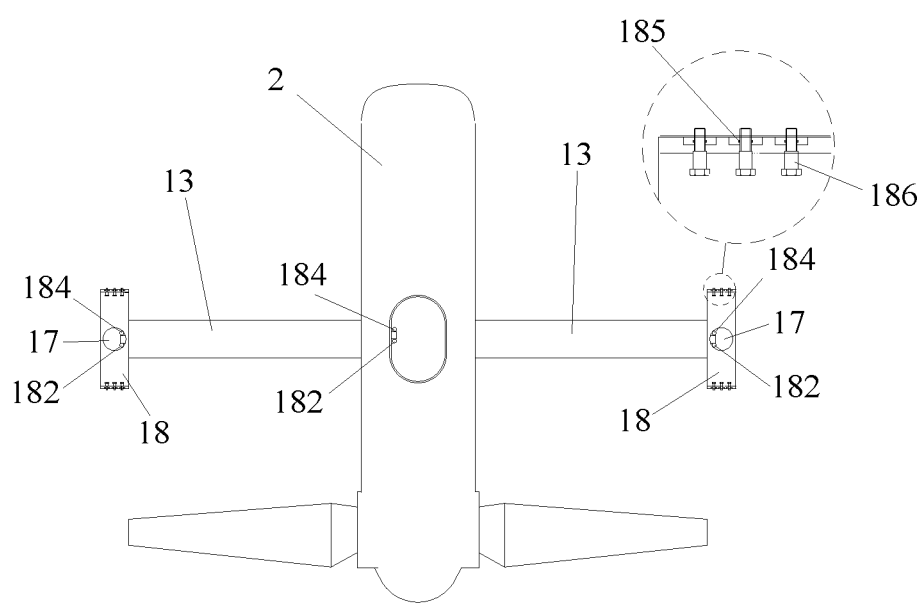
FIG. 7 is a top view of an inner module of the large tidal current energy generating device according to the second embodiment of the present invention.
Figure 8:
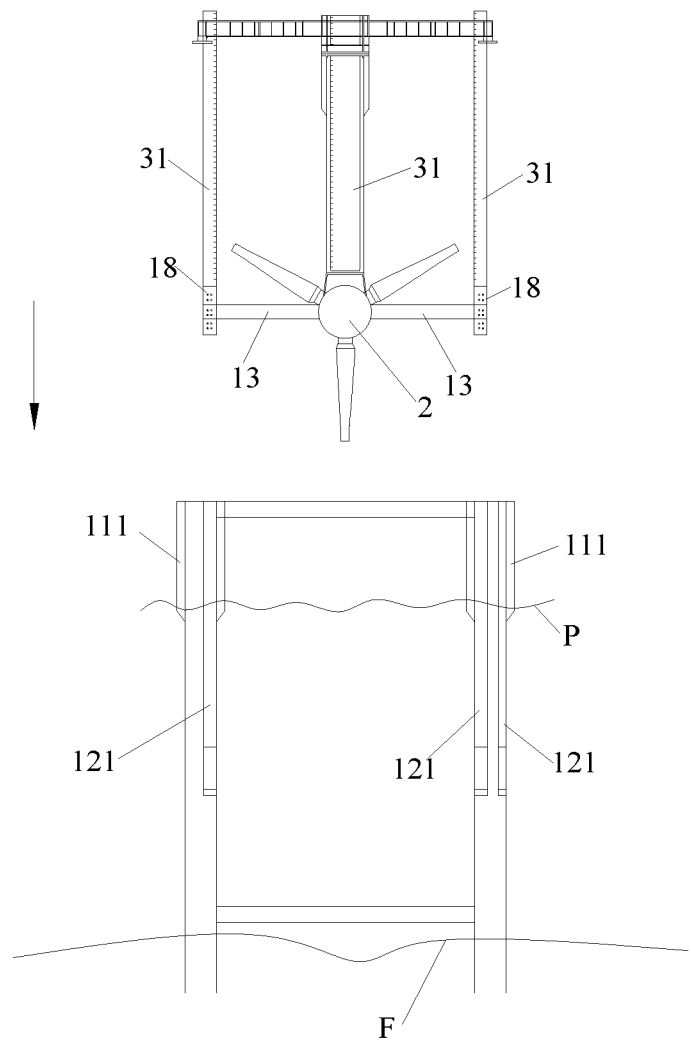
FIG. 8 is a schematic diagram showing the installation of the large tidal current energy generating device according to the second embodiment of the present invention.

FIG. 5 is a top view showing a partial of a large tidal current energy generating device according to a second embodiment of the present invention. FIG. 6 is a side view showing a partial of the large tidal current energy generating device according to the second embodiment of the present invention. FIG. 7 is a top view of an inner module of the large tidal current energy generating device according to the second embodiment of the present invention. FIG. 8 is a schematic diagram showing the installation of the large tidal current energy generating device according to the second embodiment of the present invention. Please refer to FIG. 5 to FIG. 8 together. The assembly platform 1, the horizontal axis hydro-generator 2, fixed piles 11, concrete protectors 111, force-bearing blocks 12, force-bearing supports 13, supports 14, installation space 15, barrier guiding slots 16, fixing assembly boxes 18, air blowers 181, ventilation ducts 182, water pumps 183, drain pipes 184, and side plates 19 in the second embodiment have essentially the same structures and functions as the corresponding components in the first embodiment, and therefore the same reference numerals are used. Only the differences are described below.

In the second embodiment, the large tidal current energy generating device includes the assembly platform 1, the at least one horizontal axis hydro-generator 2, and at least one suspending support 31, and the at least one horizontal axis hydro-generator 2 is separably installed in the assembly platform 1. FIG. 5 illustrates only one of the most lateral modules of the large tidal current energy generating device, thus showing only one assembly platform 1 and one horizontal axis hydro-generator 2. In actual application, multiple assembly platforms 1 and multiple horizontal axis hydro-generators 2 may be arranged in an array, thereby increasing the power generation of the entire generating device. Specifically, another horizontal axis hydro-generator 2 may be installed on the right side of the tidal current energy generating device shown in FIG. 5 and FIG. 6, and there is an additional force-bearing block 12 provided on the two fixed piles 11 located in the middle of the right side or on the supports 14 connecting the fixed piles 11, and this force-bearing block 12 is located on the outside. Accordingly, the fixed piles 11 or the supports 14 located on the right side additionally have a guiding groove 121.

In the embodiment, the tidal current energy generating device further includes one suspending support 31. One end of the suspending support 31 is located above the water surface P, and the other end thereof communicates with the horizontal axis hydro-generator 2, the force-bearing block 12, or the force-bearing support 13, so that the staffs can reach below the water surface P through the suspending support 31 for maintenance or fixing operations. Similar to the first embodiment, the assembly platform of this embodiment also includes at least two fixing assembly boxes 18, and each of the fixing assembly boxes 18 is disposed corresponding to the force-bearing block 12 and is hollow. In detail, the tidal current energy generating device in this embodiment includes three suspending supports 31. One end of the suspending support 31 in the middle is located above the water surface P and the other end communicates with the horizontal axis hydro-generator 2. The other two suspending supports 31 are respectively located on two sides of the horizontal axis hydro-generator 2 relative to the water flow direction D, and the other ends of the two suspending supports 31 respectively communicate with the fixing assembly boxes 18 located on two sides of the horizontal axis hydro-generator 2. The suspending supports 31 on two sides may be fixed in the guiding grooves 121. In other words, in this embodiment, the guiding grooves 121 serve not only to guide the sliding of the fixing assembly boxes 18, but also to facilitate the installation and fixation of the fixing assembly boxes 18. The guiding grooves 121 also serve to secure and guide the suspending supports 31. In other embodiments, if there is no fixing assembly box 18, the other ends of the suspending supports 31 on two sides may directly communicate with the force-bearing supports 13.

As the suspending support 31 is of the airtight hollow structure, a ladder may be arranged in the suspending support 31. The staffs may enter the horizontal axis hydro-generator 2 through the ladder in the suspending support 31 to work (for example, maintenance work such as replacing seal rings and replacing engine oil or arranging work of a pipeline). When the horizontal axis hydro-generator 2 fails, the staffs may enter the horizontal axis hydro-generator 2 for maintenance without hanging the horizontal axis hydro-generator 2 out of the water surface. The staffs can also reach the fixing assembly boxes 18 through the suspending supports 31 on two sides to fix and secure the fixing assembly boxes 18 and the force-bearing blocks 12.

For most existing tidal current energy generating devices, the single bearing pile is arranged below the horizontal axis hydro-generator, and the mounting way has two apparent defects. The first defect is that a large single-scaled horizontal axis hydro-generator may not be borne and the power generation cost is high as the single bearing pile abovementioned will support all the thrusts of the water flow to the horizontal axis hydro-generator to lead to a too large moment and shearing force. The second defect is that if it is necessary to maintain the horizontal axis hydro-generator, it is necessary to dismount connection between the horizontal axis hydro-generator and the bearing piles by the staffs underwater and to hang the horizontal axis hydro-generator out of the sea level, so that the maintenance potential safety hazard is great. Furthermore, in order to ensure normal operation of the horizontal axis hydro-generator, the bearing piles and the horizontal axis hydro-generator are fixed quite firmly, which means that it is quite hard to relieve the connecting relation between the two, not to mention underwater operation, so that the maintenance difficulty is quite high. Therefore, many existing tidal current energy generating devices are not maintained. Once the horizontal axis hydro-generator is damaged (for example, water enters the horizontal axis hydro-generator as the seal ring which is used for a long time is loosened or engine oil of the horizontal axis hydro-generator is replaced and the like), the whole power generation apparatus is directly scraped. It is also one of the important reasons which make the service life of the existing tidal current energy generating device be short and the cost be high, so that the tidal current energy generating device may not be commercialized.

However, when it is necessary to maintain the horizontal axis hydro-generator 2 in the embodiment, the maintenance staffs may directly enter the horizontal axis hydro-generator 2 through the suspending support 31 for underwater maintenance. In the actual application, the service life of the assembly platform of the embodiment may reach 50 years. The upper limit of use of the horizontal axis hydro-generator is 20 years. When the horizontal axis hydro-generator 2 reaches the service life, it is only necessary to relieve fixed connection between the horizontal axis hydro-generator 2 and the assembly platform 1, namely, the horizontal axis hydro-generator 2 may be hung out of the water surface from the bottom to top from the water, and a new horizontal axis hydro-generator 2 is mounted. The horizontal axis hydro-generator 2 in the embodiment is mounted separably in a hanging upside down manner, and the maintenance cost and difficulty of the horizontal axis hydro-generator 2 are far lower than those of the horizontal axis hydro-generator directly fixed to the seabed.

The horizontal axis hydro-generator 2 in the embodiment is fixed underwater by the suspending support 31 and the force-bearing supports 13 on two sides, so that it is ensured that the horizontal axis hydro-generator 2 does not swing under the action of the huge thrust of the water flow, and generated vibration is within the safe range, too. Therefore, the tidal current energy generating device provided by the embodiment may operate the horizontal axis hydro-generator of a larger installed scale stably, which means that the single installed power of the horizontal axis hydro-generator is higher. The maximum single installed power of the existing tidal current energy generating device may be 2 MW. The tidal current energy generating device in the embodiment may bear and operate the horizontal axis hydro-generator with the single installed power of 5 MW, and even 10 MW and 20 MW. It promotes development of ocean energy power generation industry and progress of technology greatly, which brings a fundamental evolution to the industry.

Meanwhile, even the existing tidal current energy generating device uses the single installed power of 2 MW, it cannot generate electricity continuously as problems such as maintenance are not solved. Even if the maintenance problem is considered for a part of tidal current energy generating devices, the power generation cost of power generation by tidal current energy is far higher than that of power generation by other energy sources due to the high maintenance cost, and thus, the commercial value of the existing tidal current energy generating device is very small all the time. The suspending support in the embodiment plays a supporting role, and the staffs may enter the horizontal axis hydro-generator to maintain, so that the maintenance cost is lowered greatly.

In addition, the previous patents and embodiments filed by the present inventor require the fabrication of a complete rectangular frame to fix and install the horizontal axis hydro-generator. However, this embodiment only needs two force-bearing supports to realize the fixation of the horizontal axis hydro-generator in the water, which greatly reduces the use of steel and further reduces the cost of the power generation device. Further, the arrangement of the frame inevitably blocks the water flow, forming a water flow section and reducing the utilization of the water flow by the horizontal axis hydro-generator. The tidal current energy generating device of this embodiment completely solves the problems without the frame.

In the embodiment, the large tidal current energy generating device further includes at least one connector 4, and the at least one connector 4 is laterally or vertically connected with one end of the suspending support 31 above the water surface and the assembly platform 1. When the connector is connected laterally, the connector 4 also securely connects the three suspending supports 31 together at the ends above the water surface. The horizontal axis hydro-generator 2 and the assembly platform 1 can be separated by uncoupling the connection between the connector 4 and the assembly platform 1.

In the embodiment, the hollow suspending support 31 acts as the personnel passage 17. In the embodiment, the three suspending supports 31, the two fixing assembly boxes 18, the two force-bearing supports 13 and the horizontal axis hydro-generator 2 together form the inner module. When the fixing assembly boxes are damaged and need to be repaired, simply release the fixation relationship between the inner module and the assembly platform 1, and then lift the inner module out of the water from the bottom to the top, so that the repair or replacement of any component of the inner module can be carried out anywhere. However, the invention is not limited thereto. In other embodiments, the personnel passages 17 on both sides can be disposed directly in the fixed piles 11, although in this case the fixed piles of the assembly platform may be at risk of being scrapped if maintenance is required, which is less economical.

Similar to the first embodiment, each of the suspending supports 31 in the tidal current energy generating device (i.e., the personnel passages 17) is correspondingly provided with the air blower 181, the ventilation duct 182, the water pump 183 and the drain pipe 184, thereby guaranteeing the life safety of the underwater staffs. The air blower 181, the ventilation duct 182, the water pump 183 and the drain pipe 184 are as same as corresponding components in the first embodiment in structure and function and will not be repeated here.

Figure 9:
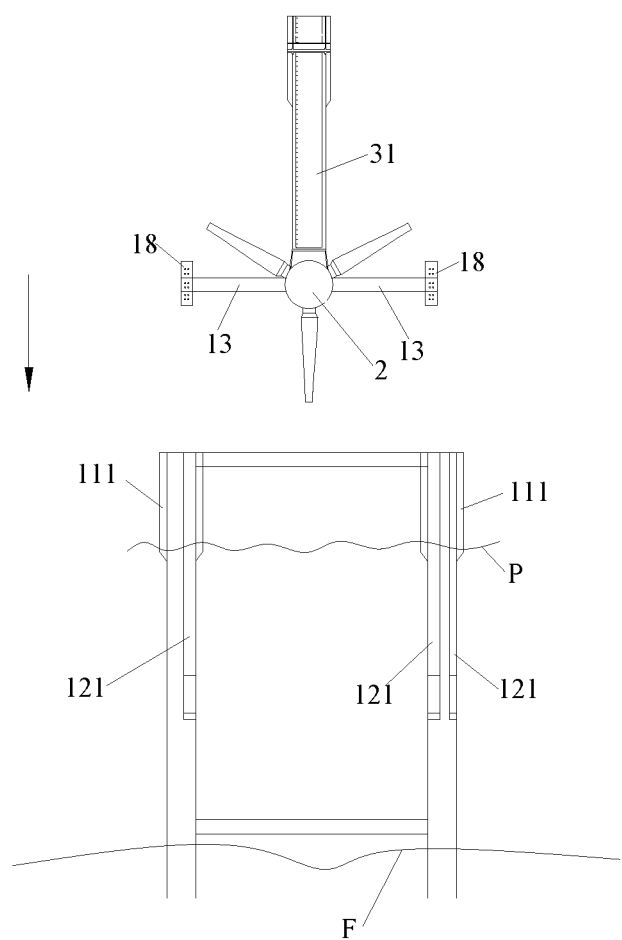
FIG. 9 is a schematic diagram showing the installation of a large tidal current energy generating device according to a third embodiment of the present invention.
Figure 10:
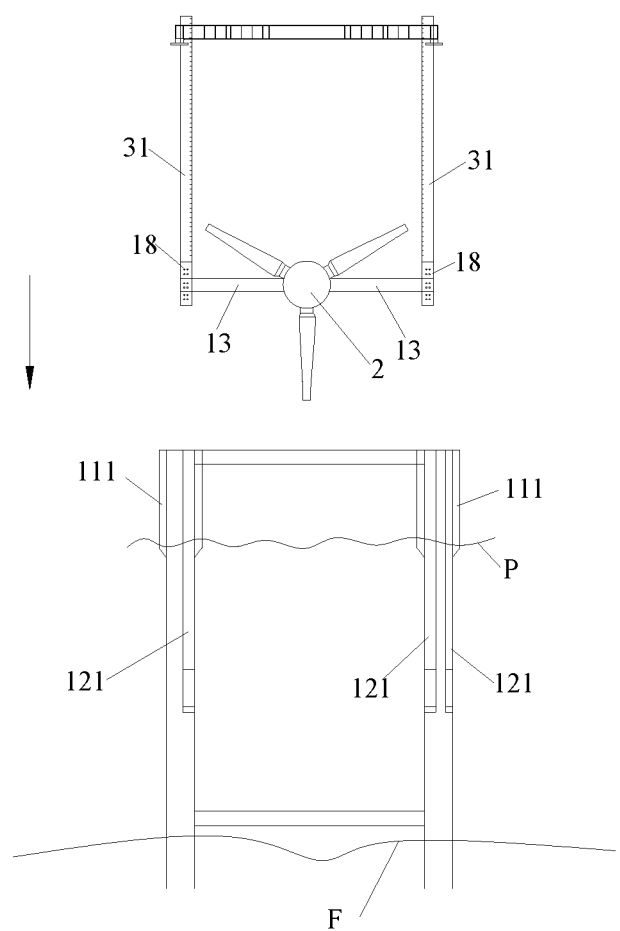
FIG. 10 is a schematic diagram showing the installation of a large tidal current energy generating device according to a fourth embodiment of the present invention.
Figure 11:
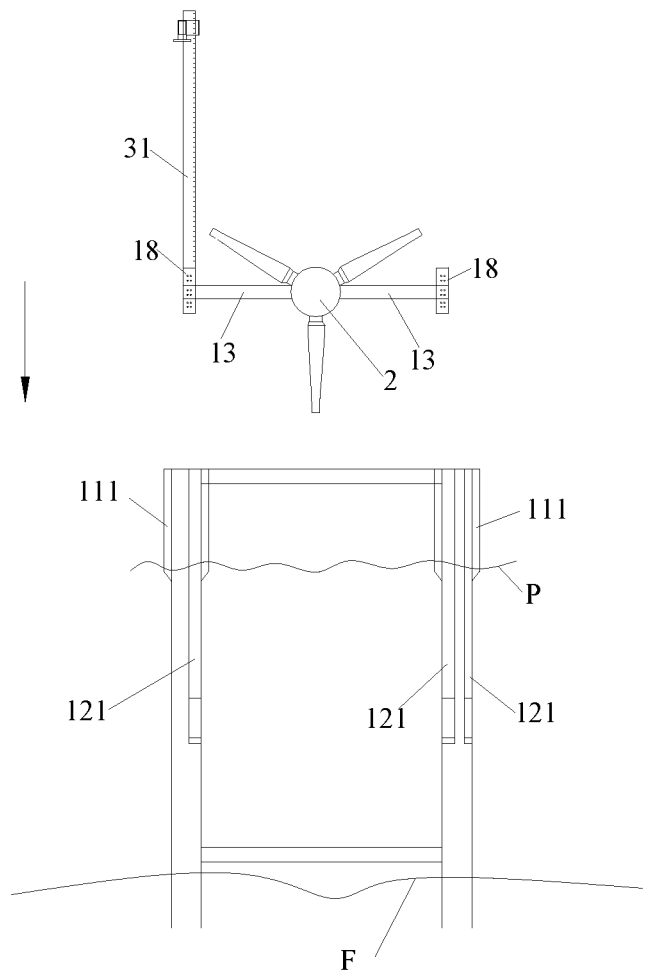
FIG. 11 is a schematic diagram showing the installation of a large tidal current energy generating device according to a fifth embodiment of the present invention.

As shown in FIG. 9, in the third embodiment, the number of the suspending support 31 may be one. The suspending support 31 in the middle is of a hermetically hollow structure, and the suspending supports 31 on both sides may not be hollow or may not be required. Staffs reach the interior of the horizontal axis hydro-generator 2 through the middle suspending support 31, and then respectively reach the other ends of the force-bearing supports 13 through the interior of the hollow force-bearing supports 13, so as to fix the force-bearing supports 13 and the force-bearing blocks 12 or fixing the fixing assembly boxes 18 and the force-bearing blocks 12. As shown in FIG. 10, in the fourth embodiment, the number of the suspending supports 31 may be two, and the suspending supports 31 located on both sides are hermetically hollow structures, and the suspending support 31 located in the middle may not be hollow or may not be required. The staffs may reach the interior of the horizontal axis hydro-generator 2 through the suspending support 31 and the hollow force-bearing support 13 on either side. As shown in FIG. 11, in the fifth embodiment, the number of the suspending support 31 may be one, and the suspending support 31 may be located on the left or right side. The suspending supports 31 located in the middle and on the other side may not be hollow or may not be required. The staffs may enter the force-bearing support 13 through the leftmost suspending support 31, then reach the interior of the horizontal axis hydro-generator 2 through the interior of the hollow force-bearing support 13, and may pass through the horizontal axis hydro-generator 2 and the other force-bearing support 13 to reach the rightmost end. The invention is not limited thereto. In other embodiments, the force-bearing supports 13 may not be hollow, the interior of which does not need to allow people to pass through, the staffs can respectively reach the corresponding locations through the three hollow suspending supports 31. In these embodiments, the air blowers 181, the ventilation ducts 182, the water pumps 183 and the drain pipes 184 may be provided correspondingly.

Figure 12:
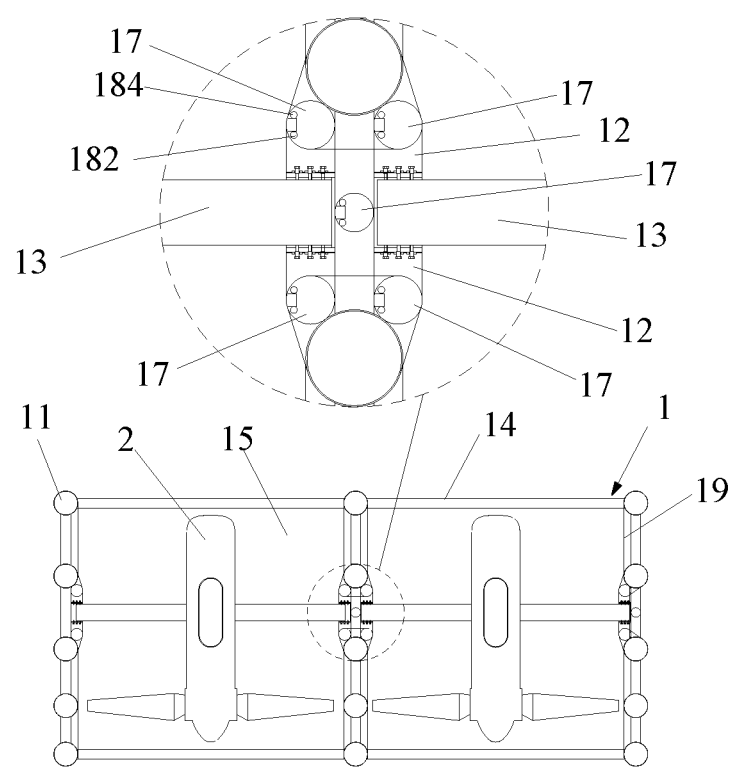
FIG. 12 is a top view of a large tidal current energy generating device according to a sixth embodiment of the present invention.

FIG. 12 is a top view of a large tidal current energy generating device according to a sixth embodiment of the present invention. The upper dashed circle in FIG. 12 is an enlargement of the lower dashed circle marking. The assembly platform 1, the horizontal axis hydro-generator 2, fixed piles 11, concrete protectors (not shown), force-bearing blocks 12, force-bearing supports 13, supports 14, installation space 15, air blowers (not shown), ventilation ducts 182, water pumps (not shown), drain pipes 184, and side plates 19 in the sixth embodiment have essentially the same structures and functions as the corresponding components in the first embodiment, and therefore the same reference numerals are used. Only the differences are described below.

In the embodiment, the assembly platform 1 does not include the fixing assembly boxes provided in the first embodiment, but still includes the sealing device and fixing assembly (e.g., the fixing bolts or jacks). One end of the force-bearing support 13 is fixed directly to the force-bearing block 12 by means of the fixing assembly, and the sealing device seals the joint. In the embodiment, four personnel passages 17 are provided along the outside of the fixed piles 11, with one end of the personnel passages 17 located above the water surface and the other end communicating with the force-bearing blocks 12. Personnel can enter the force-bearing blocks 12 through the personnel passages 17 and then adjust the fixing assembly so as to fix the force-bearing supports 13 and the force-bearing blocks 12. In another embodiment, only the middlemost personnel passage 17 in FIG. 12 may be arranged, and the personnel passage 17 may be disposed on the support 14. Through this one personnel passage, it is possible to reach the underwater working area to fix the fixing assemblies located in four places, which has the lowest cost. The air blowers, the ventilation ducts 182, the water pumps and the drain pipes 184 may be provided correspondingly, thereby guaranteeing the life safety of the staffs.

Figure 13:
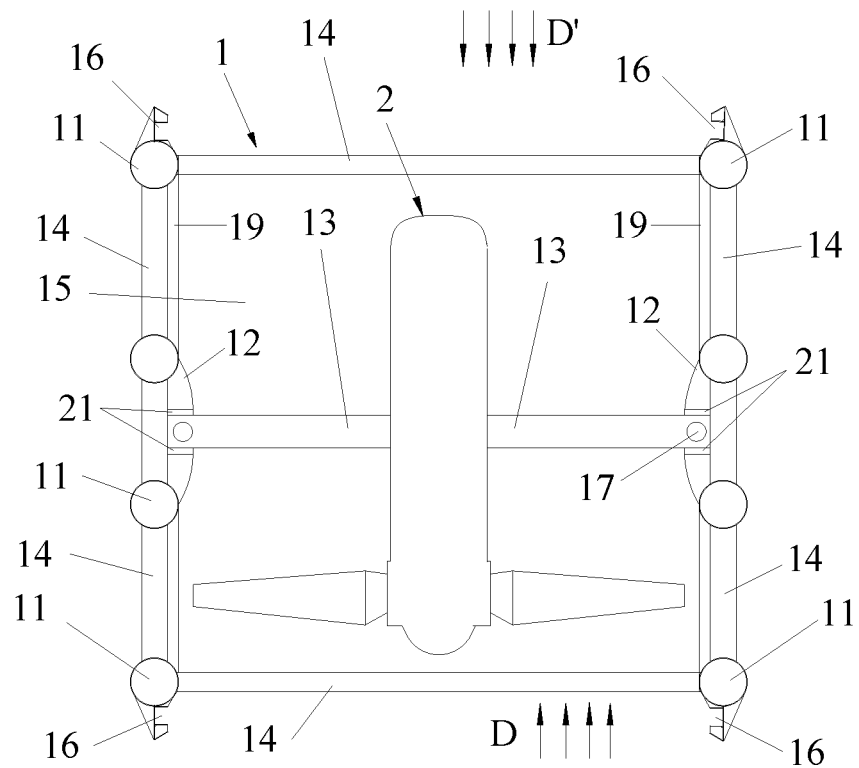
FIG. 13 is a top view of a large tidal current energy generating device according to a seventh embodiment of the present invention.

FIG. 13 is a top view of a large tidal current energy generating device according to a seventh embodiment of the present invention. The assembly platform 1, the horizontal axis hydro-generator 2, fixed piles 11, concrete protectors 111, force-bearing blocks 12, force-bearing supports 13, supports 14, installation space 15, barrier guiding slots 16, personnel passages 17, air blowers, ventilation ducts, water pumps, drain pipes, and side plates 19 in the seventh embodiment have essentially the same structures and functions as the corresponding components in the first embodiment, and therefore the same reference numerals are used. Only the differences are described below.

In the seventh embodiment, the assembly platform 1 does not include the fixing assembly boxes. The assembly platform further includes at least two groups of shock absorbers 21, and each group of the shock absorbers 21 is arranged between the force-bearing support 13 and the force-bearing block 12. Each group of the shock absorbers 21 includes two shock absorbing members, respectively located on the upstream side and downstream side of the end of the force-bearing support 13 away from the horizontal axis hydro-generator 2. Each shock absorber is against the force-bearing block 12. The shock absorbers 21 may be made of special polyethylene macromolecular materials, rubber materials or springs and the like. By arranging the shock absorbers 21, resonance which may be generated by the horizontal axis hydro-generator may be reduced effectively.

Figure 14:
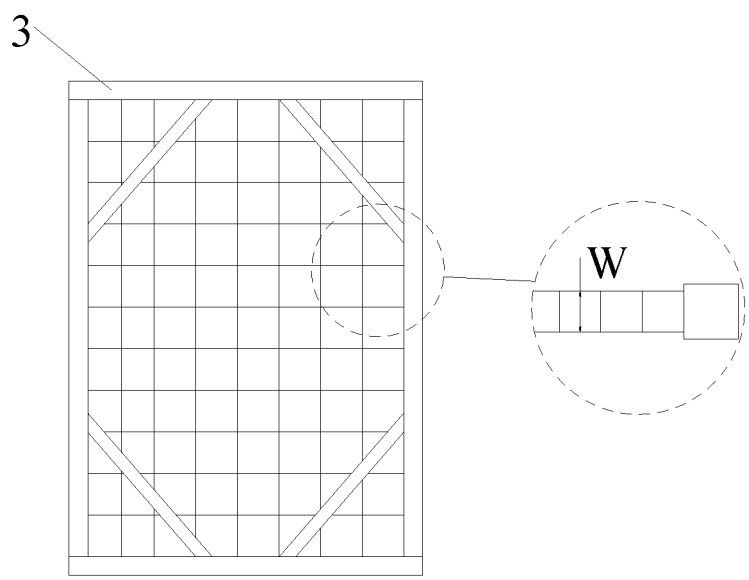
FIG. 14 is a schematic diagram showing a barrier provided in the eighth embodiment.

FIG. 14 is a schematic diagram showing a barrier provided in the eighth embodiment. A dashed line circle at the right of FIG. 14 is a top view of the part marked by the dashed line circle at the left. In the embodiment, the assembly platform includes at least two barriers 3 which are respectively arranged on upstream and downstream sides of the horizontal axis hydro-generator 2, a width W of each of the barriers 3 along a water flow direction being greater than or equal to 8 cm. An existing tidal current energy generating device often ignores damage caused by foreign matters in a sea (for example, ocean garbage, floating ice in the sea and the like) on the impeller of the hydro-generator. The inventor has noted that. By way of arranging the barriers, the probability that the ocean foreign matters are involved in the impeller is reduced. However, it is found through practice more than a year that if the barrier is the barrier formed by weaving steel wires, impacted by the water flow continuously, the joint of the steel wires rub with each other, and the thickness of the steel wires at the joint is reduced continuously. Finally, the steel wires are broken, so that the effect of the barriers that intercept the ocean foreign matters is lost. More important, the broken steel wires will be twisted into the impeller of the hydro-generator to damage the blades, which leads to damage of the whole horizontal axis hydro-generator. Therefore, the impeller is not protected, and the maintenance cost is raised accidentally. Therefore, as the width of the barrier 3 along the water flow direction is set to be greater than or equal to 8 cm, regardless of impact of the water flow, the barrier is no longer damaged. As a result of specialty in the field, the cost is hugely raised once the tidal current energy shaft horizontal axis hydro-generator is maintained or the component is replaced, which hinders commercial application of the tidal current energy generating device. Those skilled in the art often fall into a wrong region previously and consider the problem theoretically all the time but ignore the economic applicability of the power generation apparatus truly put into use. The parameter 8 cm is the parameter which is obtained by the inventor who draws lessons from the past through continuous practice accumulation and finally determines that the barrier is long enough.

In the embodiment, the height of each barrier grid along the water depth direction is still the diameter of the steel wire, namely, about 8 mm. In the actual application, the width W of the barrier 3 along the water flow direction may be 30 cm, which effectively prevents collision of ice in surrounding waters in the north of Canada and further ensures that the steel wires are not twisted. In the embodiment, the lengths of the barriers perpendicular to the water flow direction and parallel to the water surface are determined according to the dimension of the correspondingly mounted assembly platform, which is not defined herein, for example, it may be 15*20 m. The height of the barrier along the water depth direction is determined according to a stress condition of a water flow environment of an implementation place, which is not defined specifically herein. The screen of the barrier may be of a square or rhombus structure. The amplitude of the screen distance is not defined specifically herein, and the screen may be 30*30 cm. In addition, the patent does not define the specific material of the barrier supports and the blocking net.

Figure 15:
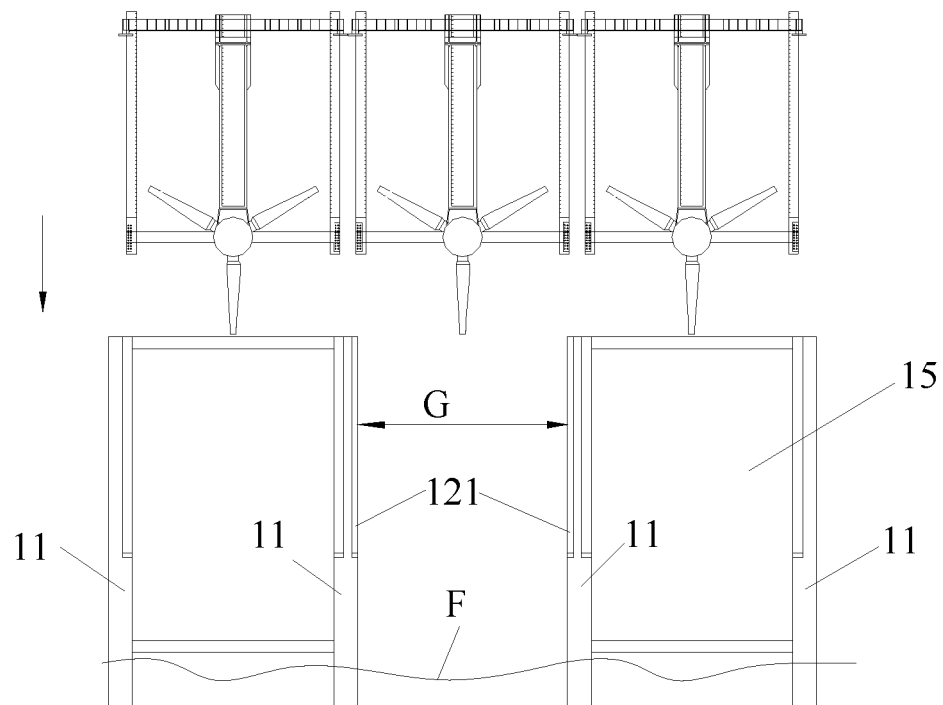
FIG. 15 is a schematic diagram showing a large tidal current energy generating device according to a ninth embodiment of the present invention.
Figure 16:
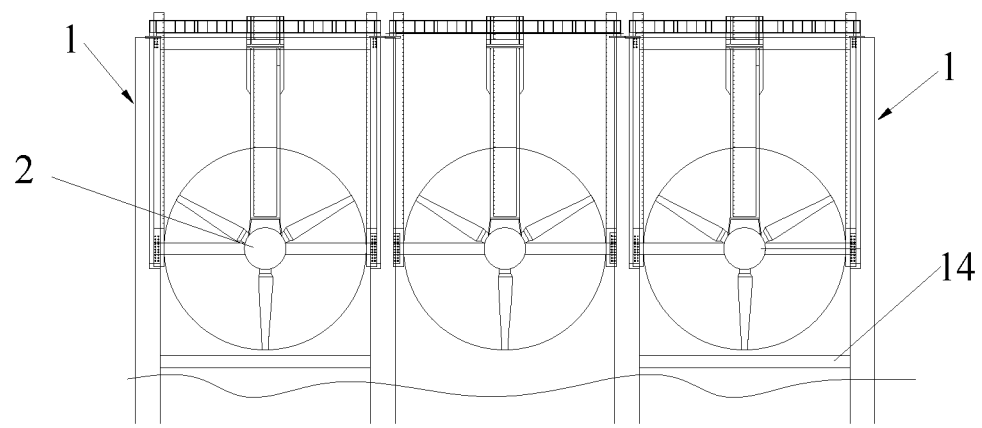
FIG. 16 is a schematic diagram showing the installation of the large tidal current energy generating device according to the ninth embodiment of the present invention.

FIG. 15 is a schematic diagram showing a large tidal current energy generating device according to a ninth embodiment of the present invention. FIG. 16 is a schematic diagram showing the installation of the large tidal current energy generating device according to the ninth embodiment of the present invention. As shown in FIG. 15 and FIG. 16, the large tidal current energy generating device includes two assembly platforms 1 and at least three horizontal axis hydro-generators 2. The assembly platforms 1 and the horizontal axis hydro-generators 2 in the ninth embodiment may have the same structure as the assembly platform and horizontal axis hydro-generator disclosed in the second embodiment, and the same numeral references are used to indicate the same structures. The tidal current energy generating device in the ninth embodiment also includes all the other components mentioned in the first or second embodiment and will not be described herein.

In the nineth embodiment, the assembly platform 1 includes at least four fixed piles 11, the at least four fixed piles 11 are connected integrally through the supports 14, and the four fixed piles 11 enclose to form an installation space 15. One end of each of the fixed piles 11 is driven to be fixed to a seabed F and the other end of the fixed pile extends to be above a water surface. The at least four fixed piles 11 are arranged in left and right columns relative to a water flow direction, and in each column, at least two fixed piles 11 are arranged sequentially along the water flow direction. At least one horizontal axis hydro-generator 2 is installed inside the installation space 15 of each assembly platform 1. At least two assembly platforms 1 are arranged left and right relative to the water flow direction, and a spacing G between the two assembly platforms 1 is matched with the impeller diameter of one horizontal axis hydro-generator 2 so that at least one additional horizontal axis hydro-generator 2 can be installed between the two assembly platforms 1. The direction of the spacing G is parallel to the horizontal plane and perpendicular to the direction of the water flow. Specifically, the length of the spacer G is greater than the impeller diameter of one horizontal axis hydro-generator 2 so that one horizontal axis hydro-generator 2 can fit between the two assembly platforms 1. Each assembly platform 1 has one horizontal axis hydro-generator 2 installed therein along the direction parallel to the horizontal plane, and one or more horizontal axis hydro-generators 2 can be installed along the water depth direction (i.e., the direction perpendicular to the horizontal plane). Similarly, one horizontal axis hydro-generator 2 is installed between the two assembly platforms along the direction parallel to the horizontal plane, and one or more horizontal axis hydro-generators 2 may be installed along the water depth direction (i.e., the direction perpendicular to the horizontal plane).

For the tidal current energy generating device disclosed by the previous patents and embodiments filed by the present inventor put into application, a horizontal axis hydro-generator is first installed inside an inner frame on shore to form an inner module, then an outer frame is piled and fixed on the seabed to form an assembly platform, and then the inner module is lifted into the outer frame in the water to complete the installation of the tidal current energy generating device. In terms of the manufacturing costs, the total manufacturing costs of a tidal current energy generating device includes the manufacturing cost of the assembly platform, the manufacturing cost of the outer and inner frames, and the manufacturing cost of the horizontal axis hydro-generator itself. The tidal current energy generating device in the present embodiment, as well as any embodiments mentioned in this disclosure, abandons the use of conventional frames and greatly reduces the amount of steel needed in the manufacturing process, thereby significantly reducing the manufacturing costs.

Secondly, as far as the installation costs are concerned, the installation costs of existing tidal current energy generating device includes the installation cost of the assembly platform and the installation cost of the inner module. If the inner module includes a frame, the installation cost of the inner module includes the installation cost of the generator itself and the installation cost of the corresponding frame. If three hydro-generators are required to be installed in a direction perpendicular to the water flow direction and parallel to the horizontal plane, the installation cost of three frames, plus the installation cost of three hydro-generator and the installation cost of three assembly platforms, is needed accordingly. However, according to the installation method of this embodiment, in addition to not requiring to install a frame, one platform is directly removed, i.e., only two platforms are needed to install three hydro-generators, thereby making the installations cost of the tidal current energy generating device dramatically reduced. If five hydro-generators need to be arranged, only three assembly platforms are required.

In terms of the actual costs of a tidal current energy generating device, the cost of the assembly platform and the cost of the hydro-generator may be 50/50, and in most cases, the cost of the assembly platform may even be higher than the cost of the hydro-generator. The installation method disclosed in this embodiment makes the cost of "extension" of the current energy generating device in the direction perpendicular to the water flow and parallel to the horizontal plane significantly reduced, realizing the array arrangement with a lower cost and truly making the tidal current energy generating device to be a large scale.

In the actual installation process, if the fixed piles are installed too close, it will easily lead to loosening of the rock and soil of the seabed, so it is necessary to fix another pile at a distance of more than 3-5 times the diameter of the pile. This leads to low utilization of water flow by the existing tidal current energy generating device and the waste of resources. For example, if the diameter of the fixed pile is 3 m, another fixed pile needs to be driven 9 m away. Otherwise, the adjacent assembly platform will not be fixed firmly, and during operation, the collapse and skewing of the pile may occur, and the whole device may be scrapped and needs to be reinstalled. The installation method of this embodiment completely avoids the problems in the prior art and achieves full utilization of tidal energy while reducing costs.

Figure 17:
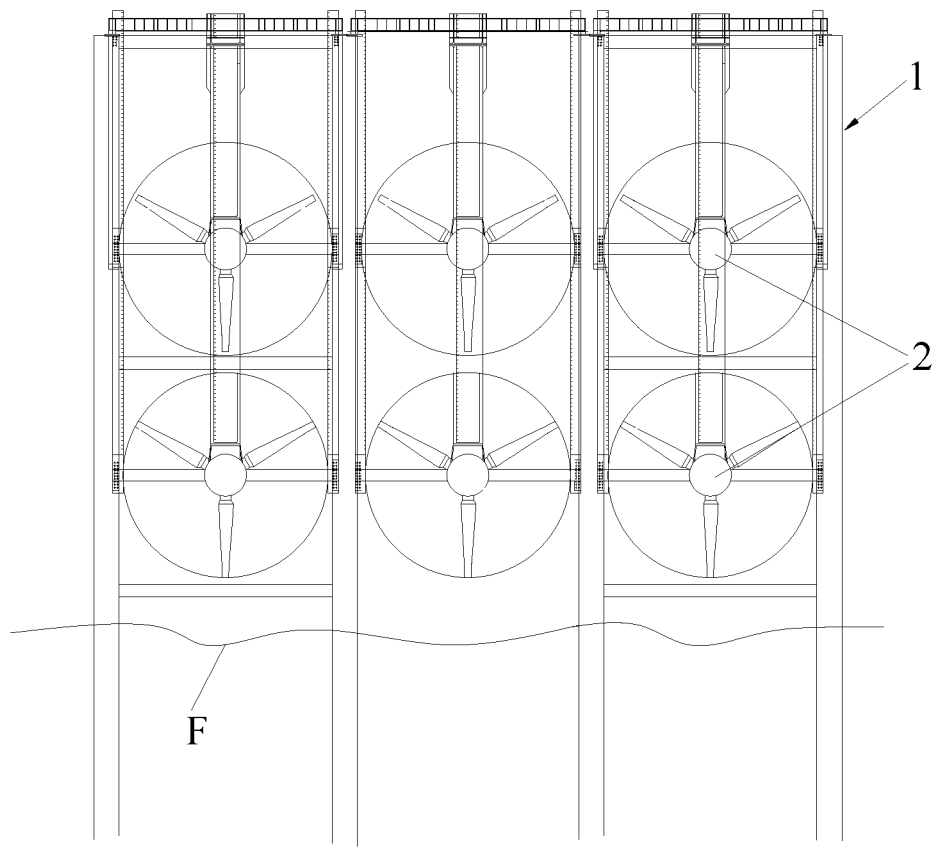
FIG. 17 is a schematic diagram showing a large tidal current energy generating device according to a tenth embodiment of the present invention.

FIG. 17 is a schematic diagram showing a large tidal current energy generating device according to a tenth embodiment of the present invention. In the tenth embodiment, at least two horizontal axis hydro-generators 2 may be installed within each assembly platform 1 along the water depth direction. The invention is not limited thereto. In real application, depending on the water depth, one or more horizontal axis hydro-generators may be installed in different installation spaces.

All features in all the embodiments mentioned in the application may be combined and used freely according to actual conditions. For example, the barriers in the eighth embodiment may be applied to the tidal current energy generating device of any one of the first, second, third, fourth, fifth, sixth, seventh, nineth, and tenth embodiments, and the barriers in the eighth embodiment may further be applied to any existing tidal current energy generating device. The tidal current energy generating device of any one of first, second, third, fourth, fifth, sixth, seventh, nineth, and tenth embodiments may adopt barriers of other structures. Multiple tidal current energy generating devices disclosed in the first, second, third, fourth, fifth, sixth, seventh, and tenth embodiments may be installed in accordance with the method disclosed in the ninth embodiment. The large tidal current energy generating devices disclosed in the first, second, third, fourth, fifth, sixth, seventh, and tenth embodiments may also be arranged in arrays in accordance with other existing arranging methods. The installation method of the ninth embodiment may also be applied to other tidal current energy generating devices with the existing structures. The structure of each assembly platform and inner module in the ninth embodiment may be or not be identical to the first, second, third, fourth, fifth, sixth, seventh, and tenth embodiments. Each of the first to ninth embodiments may have at least two horizontal axis hydro-generator installed along the water depth direction, as described in the tenth embodiment. The structure of each assembly platform and inner module of the tenth embodiment of the tidal current energy generating device may be exactly the same as the first, second, third, fourth, fifth, sixth, and seventh embodiments.

To sum up, according to the present invention, the four fixed columns and the supports are connected together to form the installation space, and then the horizontal axis hydro-generator is fixed in the installation space rather than being installed inside a frame in the prior art, thereby greatly reducing the use of steel and lowering the manufacturing and installation costs. Furthermore, by arranging the force-bearing supports and the force-bearing blocks on two sides of the horizontal axis hydro-generator, a thrust of the water flow suffered by the horizontal axis hydro-generator can be transmitted to two sides in a balanced manner, so as to disperse the thrust to the whole assembly platform, and therefore the whole assembly platform may bear a single horizontal axis hydro-generator with a higher power, which greatly reduces the power generation cost of the tidal current energy generating device. In particular, the horizontal axis hydro-generator of the present invention has "fixing points" in the water, so that a problem that the horizontal axis hydro-generator is easily damaged due to a resonance phenomenon as a result of shaking under the action of the huge thrust of the water flow in the prior art. By adopting the large tidal current energy generating device and the assembly platform thereof provided by the present disclosure, the tidal current energy generating device can be truly made large-scale, and the cost of tidal current energy power generation can be reduced to be lower than the cost of thermal power generation, thereby truly realizing commercial popularization and application of tidal current energy power generation.

Although the invention has been disclosed by the preferred embodiment as above, it is not intended to limit the invention, and anyone skilled in the art may make slight changes and modifications without departing from the spirit and scope of the invention, so the protection scope of the invention shall be subject to the protection scope as claimed in the claims.

What is claimed is:

1. An assembly platform of a large tidal current energy generating device, wherein at least one horizontal axis hydro-generator is installed inside the assembly platform, and the assembly platform of the large tidal current energy generating device comprises:
    supports;
    at least four fixed piles, wherein the at least four fixed piles are connected by the supports to form an installation space, the at least one horizontal axis hydro-generator is installed inside the installation space, one end of each of the at least four fixed piles is driven to be fixed to a seabed, the other end of each of the at least four fixed piles extends to be-above a water surface, the at least four fixed piles are arranged in left and right columns relative to a water flow direction, and at least two fixed piles in each column are arranged in sequence along the water flow direction;
    at least two force-bearing blocks, wherein the at least two force-bearing blocks are fixed to the corresponding fixed piles or supports and located on left and right sides of the at least one horizontal axis hydro-generator below the water surface, respectively;
    at least two force-bearing supports, wherein ends of the at least two force-bearing supports are respectively mounted on the left and right sides of the at least one horizontal axis hydro-generator relative to the water flow direction, and other ends of the at least two force-bearing supports are respectively connected with the corresponding force-bearing blocks so as to resist an impact force of a water flow on the at least one horizontal axis hydro-generator; and
    at least one personnel passage, wherein one end of the at least one personnel passage is located above the water surface, and another end of the personnel passage communicates with the horizontal axis hydro-generator, one of the force-bearing supports, or one of the force-bearing blocks, enabling access below the water surface through the at least one personnel passage to perform maintaining or fixing operations.

2. The assembly platform of the large tidal current energy generating device according to claim 1, wherein the assembly platform further comprises at least two groups of shock absorbers, and each group of the shock absorbers is arranged between the force-bearing supports and the force-bearing blocks.

3. The assembly platform of the large tidal current energy generating device according to claim 1, wherein the assembly platform further comprises at least one air blower and a ventilation duct, the ventilation duct is fixedly or detachably arranged along an inner side or outer side of the personnel passage, the ventilation duct passes from above the water surface to below the water surface.

4. The assembly platform of the large tidal current energy generating device according to claim 1, wherein the assembly platform further comprises at least one water pump and at least one drain pipe, the at least one drain pipe is fixedly or detachably arranged along an inner side or outer side of the personnel passage, the at least one drain pipe passes from above the water surface to below the water surface, such that the water pump pumps accumulated water from under the water surface and discharges the water above the water surface by the drain pipe.

5. The assembly platform of the large tidal current energy generating device according to claim 1, wherein the assembly platform further comprises at least two fixing assembly boxes, and each of the fixing assembly boxes is disposed at a corresponding force-bearing block and is of a hollow structure.

6. The assembly platform of the large tidal current energy generating device according to claim 1, wherein each of the fixed piles of the assembly platform provided with a concrete protector.

7. A large tidal current energy generating device, comprising:
    the assembly platform as claimed in claim 1;

the at least one horizontal axis hydro-generator, separably installed inside the assembly platform; and at least one suspending support, wherein the at least one suspending support is of an airtight hollow structure, one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

8. The large tidal current energy generating device according to claim 7, wherein the assembly platform further comprises at least two fixing assembly boxes, and each of the fixing assembly boxes is disposed corresponding to the force-bearing blocks and is of a hollow structure, at least two suspending supports are provided, and the other ends of the at least two suspending supports communicate with the corresponding fixing assembly boxes, respectively.

9. The large tidal current energy generating device according to claim 7, wherein at least three suspending supports are provided, the other ends of two suspending supports communicate with the force-bearing blocks or the force-bearing supports located on two sides of the horizontal axis hydro-generator, and the other end of the other suspending support communicates with the horizontal axis hydro-generator.

10. A large tidal current energy generating device, comprising:

the assembly platform as claimed in claim 2;

the at least one horizontal axis hydro-generator, separably installed inside the assembly platform; and at least one suspending support, wherein the at least one suspending support is of an airtight hollow structure, one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

11. A large tidal current energy generating device, comprising:

the assembly platform as claimed in claim 1;

the at least one horizontal axis hydro-generator, separably installed inside the assembly platform; and at least one suspending support, wherein the at least one suspending support is of an airtight hollow structure, one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

12. A large tidal current energy generating device, comprising:

the assembly platform as claimed in claim 3;

the at least one horizontal axis hydro-generator, separably installed inside the assembly platform; and at least one suspending support, wherein the at least one suspending support is of an airtight hollow structure, one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

13. A large tidal current energy generating device, comprising:

the assembly platform as claimed in claim 4;

the at least one horizontal axis hydro-generator, separably installed inside the assembly platform; and at least one suspending support, wherein the at least one suspending support is of an airtight hollow structure, one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

14. A large tidal current energy generating device, comprising:

the assembly platform as claimed in claim 5;

the at least one horizontal axis hydro-generator, separably installed inside the assembly platform; and at least one suspending support, wherein the at least one suspending support is of an airtight hollow structure, one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

15. A large tidal current energy generating device, comprising:

the assembly platform as claimed in claim 6;

the at least one horizontal axis hydro-generator, separably installed inside the assembly platform; and at least one suspending support, wherein the at least one suspending support is of an airtight hollow structure, one end of the suspending support is located above the water surface, and the other end of the suspending support communicates with the horizontal axis hydro-generator, the force-bearing blocks, or the force-bearing supports, enabling people to reach below the water surface through the suspending support for maintenance or fixing operations.

* * * * *